(12) United States Patent
Heishi et al.

(10) Patent No.: US 7,386,844 B2
(45) Date of Patent: Jun. 10, 2008

(54) COMPILER APPARATUS AND METHOD OF OPTIMIZING A SOURCE PROGRAM BY REDUCING A HAMMING DISTANCE BETWEEN TWO INSTRUCTIONS

(75) Inventors: Taketo Heishi, Osaka (JP); Hajime Ogawa, Suita (JP); Takenobu Tani, Jyoyo (JP); Yukihiro Sasagawa, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 884 days.

(21) Appl. No.: 10/760,429

(22) Filed: Jan. 21, 2004

(65) Prior Publication Data

US 2004/0154006 A1 Aug. 5, 2004

(30) Foreign Application Priority Data

Jan. 28, 2003 (JP) ............................. 2003-019365

(51) Int. Cl.
*G06F 9/45* (2006.01)
*G06F 1/00* (2006.01)
*G06F 1/26* (2006.01)

(52) U.S. Cl. ...................... 717/161; 717/151; 717/159; 713/300; 713/320

(58) Field of Classification Search ........ 717/140–161; 713/300–340
See application file for complete search history.

(56) References Cited

U.S. PATENT DOCUMENTS 5,537,656 A * 7/1996 Mozdzen et al. ............ 713/323
5,572,736 A * 11/1996 Curran ....................... 713/320
5,574,921 A * 11/1996 Curran ....................... 713/320
5,790,874 A     8/1998 Takano et al.
5,835,776 A * 11/1998 Tirumalai et al. ........... 717/161
5,854,935 A * 12/1998 Enomoto .................... 717/159

(Continued)

FOREIGN PATENT DOCUMENTS

JP       63-126018       5/1988

(Continued)

OTHER PUBLICATIONS

Lee et al., "Compiler Optimization on Instruction Scheduling for Low Power," 2000, IEEE, p. 55-60.*

(Continued)

*Primary Examiner*—Wei Zhen
*Assistant Examiner*—Qing Chen
(74) *Attorney, Agent, or Firm*—Wenderoth, Lind & Ponack, L.L.P.

(57) ABSTRACT

A compiler apparatus is capable of generating instruction sequences causing a processor to operate with lower power consumption. The compiler apparatus translates a source program into a machine language program for a processor including execution units which can execute instructions in parallel, and including instruction issue units which issue the instructions executed, respectively, by the execution units. The compiler apparatus includes a parser unit operable to parse the source program, an intermediate code conversion unit operable to convert the parsed source program into intermediate codes, an optimization unit operable to optimize the intermediate codes to reduce a hamming distance between instructions from the same instruction issue unit in consecutive instruction cycles, and includes a code generation unit operable to convert the optimized intermediate codes into machine language instructions.

13 Claims, 45 Drawing Sheets

U.S. PATENT DOCUMENTS

| | | | |
|---|---|---|---|
| 6,002,878 A * | 12/1999 | Gehman et al. | 713/340 |
| 6,535,984 B1 * | 3/2003 | Hurd | 713/320 |
| 6,725,450 B1 * | 4/2004 | Takayama | 717/139 |
| 6,826,704 B1 * | 11/2004 | Pickett | 713/320 |
| 6,938,248 B2 * | 8/2005 | Kitakami et al. | 717/159 |
| 7,073,169 B2 * | 7/2006 | Ogawa et al. | 717/161 |
| 7,076,775 B2 * | 7/2006 | Webster et al. | 717/159 |
| 7,299,369 B2 * | 11/2007 | Webster et al. | 713/320 |
| 7,302,597 B2 * | 11/2007 | Webster | 713/320 |
| 2002/0161986 A1 | 10/2002 | Kamigata et al. | |
| 2002/0199177 A1 * | 12/2002 | Ogawa et al. | 717/149 |
| 2003/0212914 A1 * | 11/2003 | Webster et al. | 713/300 |
| 2004/0015922 A1 * | 1/2004 | Kitakami et al. | 717/154 |
| 2005/0005180 A1 * | 1/2005 | Webster | 713/320 |
| 2005/0010830 A1 * | 1/2005 | Webster | 713/320 |
| 2005/0022041 A1 * | 1/2005 | Mycroft et al. | 713/320 |
| 2005/0229017 A1 * | 10/2005 | Webster | 713/320 |

FOREIGN PATENT DOCUMENTS

| | | |
|---|---|---|
| JP | 08-101777 | 4/1996 |
| JP | 2001-22591 | 1/2001 |
| JP | 2001-92661 | 4/2001 |
| JP | 2002-123331 | 4/2002 |
| JP | 2002-323982 | 11/2002 |

OTHER PUBLICATIONS

Pedram, Massous, "Power Optimization and Management in Embedded Systems," 2001, ACM, p. 239-244.*

Chakrapani et al., "The Emerging Power Crisis in Embedded Processors: What can a poor compiler do?" 2001, ACM, p. 287-291.*

Hirohiko Ono, "*A Practicing Engineer Discusses Computer Science—VLIW (Parallel ALU) Machine and Compiler*", Interface, vol. 15, No. 11, CQ Publishing Company, Nov. 1, 1989, pp. 259-266.

* cited by examiner

FIG. 11

| Instruction | Specific processing | 31 30 29 ... 16 15 (Op1) | 11 10 ... 6 5 | 1 0 |
|---|---|---|---|---|
| ld Rs, Rd | (Rs)→Rd | 0 1 0 1 0 0 0 0 0 0 0 0 0 1 0 0 0 | 0 0 0 1 | Rs | Rd |
| st Rs, Rd | (Rs)→((Rd)) | 0 1 0 1 0 0 0 0 0 0 0 0 0 1 0 0 1 | 0 0 0 1 | Rs | Rd |
| mul1 Rs, Rd | (Rs)×(Rd)→Rd | 1 0 0 0 1 0 0 1 0 0 0 1 0 1 0 0 0 | 0 0 0 1 | Rs | Rd |
| mul2 Rs1, Rs2, Rd | (Rs1)×(Rs2)→Rd | 1 0 0 0 1 0 0 1 0 0 0 1 0 1 0 0 0 | Rs1 | Rs2 | Rd |
| add1 Rs, Rd | (Rs)+(Rd)→Rd | 1 1 0 0 0 0 0 1 0 1 1 1 0 1 1 0 0 | 0 0 0 1 | Rs | Rd |
| add2 Rs1, Rs2, Rd | (Rs1)+(Rs2)→Rd | 1 1 0 0 0 0 0 1 0 1 1 1 0 1 1 1 0 | Rs1 | Rs2 | Rd |
| sub1 Rs, Rd | (Rs)-(Rd)→Rd | 1 1 0 0 0 0 0 1 0 1 1 1 1 0 0 0 1 | 0 0 0 1 | Rs | Rd |
| sub2 Rs1, Rs2, Rd | (Rs1)-(Rs2)→Rd | 1 1 0 0 0 0 0 1 0 1 1 1 1 0 0 1 0 | Rs1 | Rs2 | Rd |
| mov1 Rs, Rd | (Rs)→Rd | 1 1 0 0 0 0 1 1 0 0 0 1 0 1 1 0 1 | 0 0 0 1 | Rs | Rd |
| mov2 Imm, Rd | Imm→Rd | 1 1 0 0 0 0 1 1 0 1 1 0 0 0 0 0 0 | Imm | Rd |
| div Rs, Rd | (Rs)÷(Rd)→Rd | 1 1 1 0 0 1 0 0 0 0 1 1 1 0 0 0 0 | 0 0 0 1 | Rs | Rd |
| mod Rs, Rd | (Rs)%(Rd)→Rd | 1 1 1 0 0 1 0 0 0 0 1 1 1 0 1 0 0 | 0 0 0 1 | Rs | Rd |

Bit field annotations:
- Bits 31–29: Set of operations
- Bits 28–15: Op1-1, Op2, Op3, Op4
- Bits 15–10: Op1-2
- Bits 31–10 together: Op1
- Bits 1–0: Parallel execution boundary information

FIG. 15

| Cycle | 1st slot | 2nd slot | 3rd slot |
|---|---|---|---|
| 1 | ld Vr0, Vr1<br>(Node N1) | mul2 Vr2, Vr3, Vr4<br>(Node N11) | add1 Vr5, Vr6<br>(Node N6) |
| | | | |

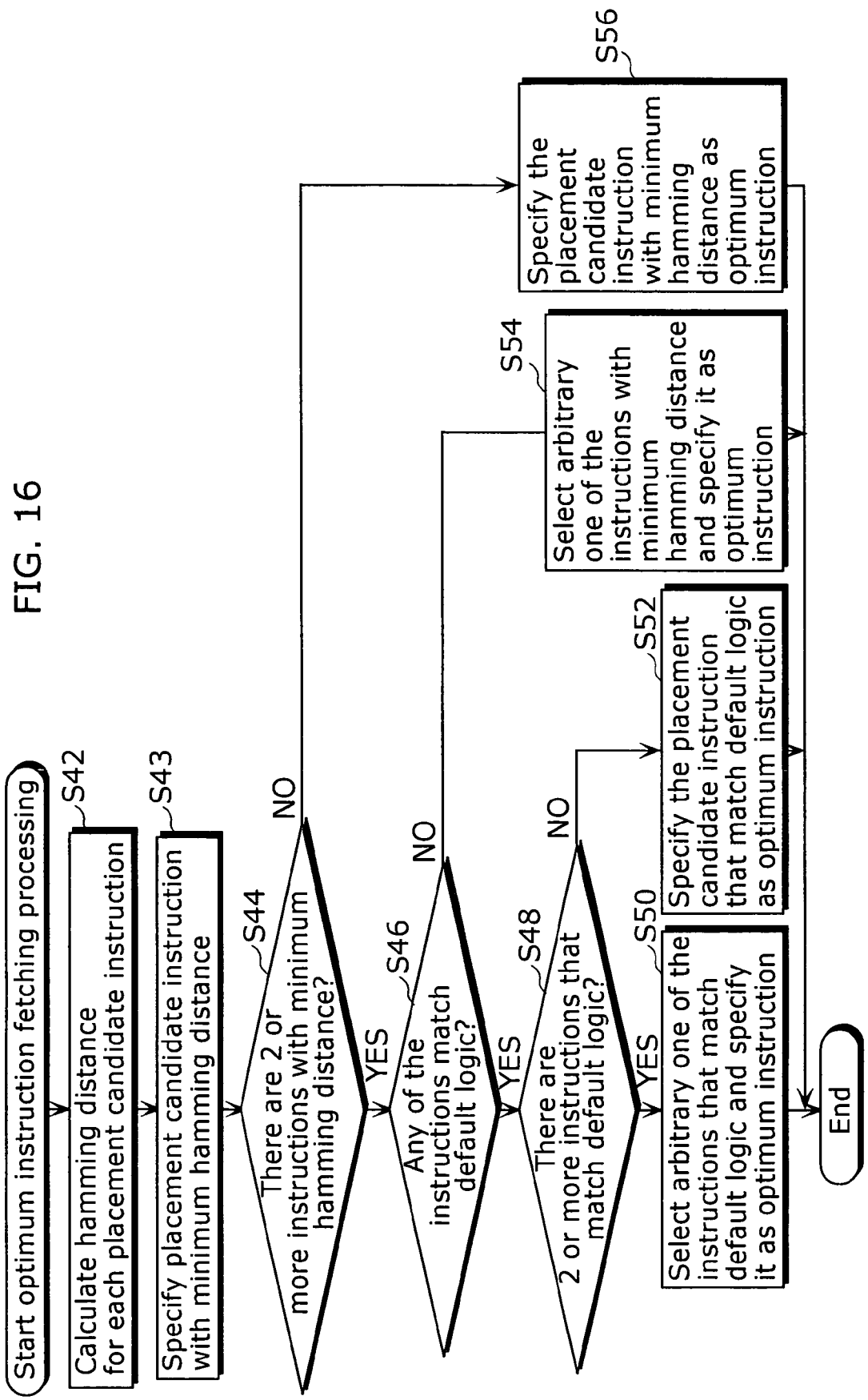

FIG. 17A

| Instruction | 31 | | | | | | 25 24 | | | | | | | 17 16 | | | | | | | 12 11 10 | | | 6 5 | | | 1 0 |
|---|---|---|---|---|---|---|---|---|---|---|---|---|---|---|---|---|---|---|---|---|---|---|---|---|---|---|---|
| Cycle N | ld Vr11, Vr12 | 0 | 1 | 0 | 1 | 0 | 1 | 1 | 0 | 0 | 0 | 0 | 0 | 0 | 0 | 0 | 0 | 0 | 1 | 0 | 0 | 0 | 0 | Vr11 | | Vr12 |
| Cycle N+1 | st Vr13, Vr14 | 0 | 1 | 0 | 1 | 0 | 1 | 0 | 1 | 0 | 0 | 0 | 0 | 0 | 0 | 0 | 0 | 0 | 1 | 0 | 1 | 1 | Vr13 | | Vr14 |

⇨ Hamming distance
5

FIG. 17B

| Instruction | 31 | | | | | | 26 25 | | | | | | 20 18 17 16 | | | | | | | 12 11 10 | | | 6 5 | | | 1 0 |
|---|---|---|---|---|---|---|---|---|---|---|---|---|---|---|---|---|---|---|---|---|---|---|---|---|---|---|---|
| Cycle N | ld Vr11, Vr12 | 0 | 1 | 0 | 1 | 0 | 1 | 1 | 0 | 0 | 0 | 0 | 0 | 0 | 0 | 0 | 0 | 0 | 1 | 0 | 0 | 0 | 0 | Vr11 | | Vr12 |
| Cycle N+1 | add1 Vr13, Vr14 | 1 | 1 | 0 | 1 | 0 | 0 | 0 | 0 | 0 | 0 | 0 | 1 | 0 | 1 | 1 | 0 | 0 | 0 | 0 | 0 | 1 | Vr13 | | Vr14 |

⇨ Hamming distance
8

FIG. 18A

| Instruction | 31 30 | 28 27 26 25 | 23 22 | 19 18 | 16 | 11 10 | 6 5 | 1 0 |
|---|---|---|---|---|---|---|---|---|
| Cycle N   ld Vr11, Vr12 | 0 1 | 0 1 0 1 | 0 0 | 0 0 | 0 0 1 | Vr11 | Vr12 |
| Cycle N+1 mul2 Vr13,Vr14,Vr15 | 1 0 | 0 0 1 0 | 0 1 1 | 0 0 | 1 0 0 Vr13 | Vr14 | Vr15 |

⇒ Hamming distance 11

FIG. 18B

| Instruction | 31 30 | 28 27 26 25 | 25 24 | 17 16 | 11 10 | 6 5 | 1 0 |
|---|---|---|---|---|---|---|---|
| Cycle N   ld Vr11, Vr12 | 0 1 | 0 1 0 1 | 0 0 | 0 0 0 0 | 0 1 0 0 0 1 | Vr11 | Vr12 |
| Cycle N+1 st Vr13, Vr14 | 0 1 | 0 1 0 1 | 0 0 | 0 0 0 0 | 0 1 0 0 1 1 | Vr13 | Vr14 |

⇒ Hamming distance 4

FIG. 20A | Instruction 1 | Instruction 2 | Instruction 3

FIG. 20B | Instruction 1 | Instruction 3 | Instruction 2

FIG. 20C | Instruction 2 | Instruction 1 | Instruction 3

FIG. 20D | Instruction 2 | Instruction 3 | Instruction 1

FIG. 20E | Instruction 3 | Instruction 1 | Instruction 2

FIG. 20F | Instruction 3 | Instruction 2 | Instruction 1

FIG. 21

| Cycle | 1st slot | | 2nd slot | | 3rd slot | |
|---|---|---|---|---|---|---|
| --- | --- | | --- | | --- | |
| N | ld<br>01010110000000100001 | Vr10 Vr11 | sub1<br>11000000010001010001 | Vr12 Vr13 | add1<br>11000000001011000001 | Vr14 Vr15 |
| N+1 | st<br>01010101000000100011 | Vr16 Vr17 | mul1<br>10001000110001000001 | Vr18 Vr19 | mod<br>11001000110100000000001 | Vr20 Vr21 |
| --- | --- | | --- | | --- | |

FIG. 22A

| Cycle | 1st slot | | | 2nd slot | | | 3rd slot | | |
|---|---|---|---|---|---|---|---|---|---|
| N+1 | st<br>0101010100000010000011 | Vr16 | Vr17 | mul1<br>1000100011100010000001 | Vr18 | Vr19 | mod<br>1100100011101000000001 | Vr20 | Vr21 |

FIG. 22B

| Cycle | 1st slot | | | 2nd slot | | | 3rd slot | | |
|---|---|---|---|---|---|---|---|---|---|
| N+1 | st<br>0101010100000010000011 | Vr16 | Vr17 | mod<br>1100100011101000000001 | Vr20 | Vr21 | mul1<br>1000100011100010000001 | Vr18 | Vr19 |

FIG. 22C

| Cycle | 1st slot | | | 2nd slot | | | 3rd slot | | |
|---|---|---|---|---|---|---|---|---|---|
| N+1 | mul1<br>1000100011100010000001 | Vr18 | Vr19 | st<br>0101010100000010000011 | Vr16 | Vr17 | mod<br>1100100011101000000001 | Vr20 | Vr21 |

FIG. 22D

| Cycle | 1st slot | | | 2nd slot | | | 3rd slot | | |
|---|---|---|---|---|---|---|---|---|---|
| N+1 | mul1<br>1000100011100010000001 | Vr18 | Vr19 | mod<br>1100100011101000000001 | Vr20 | Vr21 | st<br>0101010100000010000011 | Vr16 | Vr17 |

FIG. 22E

| Cycle | 1st slot | | | 2nd slot | | | 3rd slot | | |
|---|---|---|---|---|---|---|---|---|---|
| N+1 | mod<br>1100100011101000000001 | Vr20 | Vr21 | st<br>0101010100000010000011 | Vr16 | Vr17 | mul1<br>1000100011100010000001 | Vr18 | Vr19 |

FIG. 22F

| Cycle | 1st slot | | | 2nd slot | | | 3rd slot | | |
|---|---|---|---|---|---|---|---|---|---|
| N+1 | mod<br>1100100011101000000001 | Vr20 | Vr21 | mul1<br>1000100011100010000001 | Vr18 | Vr19 | st<br>0101010100000010000011 | Vr16 | Vr17 |

FIG. 23

| Cycle | 1st slot | | 2nd slot | | 3rd slot | |
|---|---|---|---|---|---|---|
| N | ld<br>01010110000000100001 | Vr10:Vr11 | sub1<br>11000000010001010001 | Vr12:Vr13 | add1<br>11000000000101000001 | Vr14:Vr15 |
| N+1 | mul1<br>10001000110010000001 | Vr18:Vr19 | st<br>01010101000001000011 | Vr16:Vr17 | mod<br>11001000110100000001 | Vr20:Vr21 |

Hamming distance between operation codes ⇒ 10

Hamming distance between operation codes ⇒ 9

Hamming distance between operation codes ⇒ 5

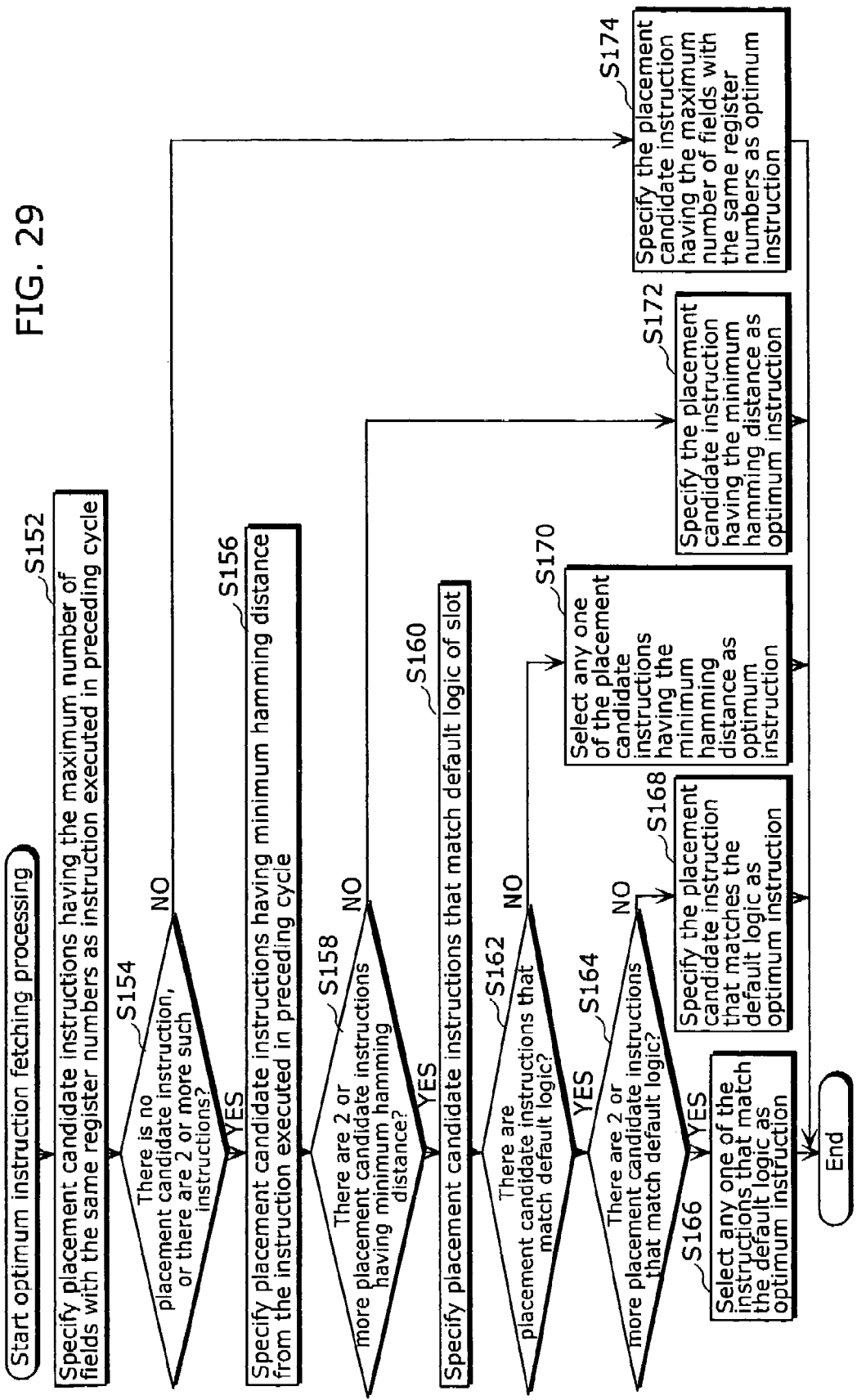

FIG. 30A

| Cycle | 1st slot | |
|---|---|---|
| N | add1<br>11000000001011000001 | R0 R2<br>00000 00010 |
| N+1 | sub1<br>11000000010001010001 | R0 R1<br>00000 00001 |

⇒ Number of register fields having the same register numbers: 1

FIG. 30B

| | | |
|---|---|---|
| N | add1<br>11000000001011000001 | R0 R2<br>00000 00010 |
| N+1 | div<br>11000100101000000001 | R0 R2<br>00000 00010 |

⇒ Number of register fields having the same register numbers: 2

FIG. 31A

| Cycle | 1st slot | | |
|---|---|---|---|
| N | mul1<br>1000100011000100000001 | R3<br>00011 | R10<br>01010 |
| N+1 | add1<br>1100000000101100000001 | R2<br>00010 | R4<br>00100 |

⇒ Hamming distance between instructions 10

FIG. 31B

| Cycle | | | |
|---|---|---|---|
| N | mul1<br>1000100011000100000001 | R3<br>00011 | R10<br>01010 |
| N+1 | sub2<br>1100000011000101010111 | R11<br>01011 | R0<br>00000 | R2<br>00010 |

⇒ Hamming distance between instructions 8

FIG. 32A

| Cycle | 1st slot | | | | |
|---|---|---|---|---|---|
| N | st | 0101010100001000011 | R1 00001 | R13 01101 | |
| N+1 | ld | 0101011000000100001 | R30 11110 | R18 10010 | |

⇓ Default logic of 1st slot

Match

FIG. 32B

| Cycle | 1st slot | | | | |
|---|---|---|---|---|---|
| N | st | 0101010100001000011 | R1 00001 | R13 01101 | |
| N+1 | sub1 | 1100000010001010001 | R8 01000 | R2 00010 | |

⇓ Default logic of 1st slot

Does not match

| Cycle | 1st slot | |
|---|---|---|
| N | add1 1100000000101100000 | R0 00000 | R2 00010 |
| N+1 | sub1 1100000000100010000 | R3 00011 | R1 00001 |

⇒ Hamming distance between register fields: 4

FIG. 40A

| Cycle | | |
|---|---|---|
| N | add1 1100000000101100000 | R0 00000 | R2 00010 |
| N+1 | div 11000100101000000000 | R7 00111 | R1 00001 |

⇒ Hamming distance between register fields: 5

| Cycle | 1st slot | | | 2nd slot | | | 3rd slot | | |
|---|---|---|---|---|---|---|---|---|---|
| | | R0 | R1 | | R2 | R3 | | R4 | R5 |
| N | ld | 00000 | 00001 | sub1 | 00010 | 00011 | add1 | 00100 | 00101 |
| | 01010110000000100001 | | | 11000000010010100001 | | | 11000000010101100001 | | |
| | | R8 | R9 | | R6 | R7 | | R10 | R11 |
| N+1 | mul1 | 01000 | 01001 | st | 00110 | 00111 | mod | 01010 | 01011 |
| | 10001000110001000001 | | | 01010101000000100011 | | | 11001000110100000001 | | |

Hamming distance between instructions: 12

Hamming distance between instructions: 11

Hamming distance between instructions: 11

FIG. 44

| Cycle | 1st slot | | | 2nd slot | | | 3rd slot | | |
|---|---|---|---|---|---|---|---|---|---|
| | | R0 | R1 | | R2 | R3 | | R4 | R5 |
| N | ld | 01010110000000010001 | 00000:00001 | sub1 | 11000000010001010001 | 00010:00011 | add1 | 11000000000101100001 | 00100:00101 |
| | | R8 | R9 | | R6 | R7 | | R10 | R11 |
| N+1 | mul1 | 10001000111000100000001 | 01000:01001 | st | 01010101000000010000011 | 00110:00111 | mod | 11001000110100000000001 | 01010:01011 |

Hamming distance between register fields → 2

Hamming distance between register fields → 2

Hamming distance between register fields → 6

FIG. 46

| Cycle | 1st slot | | | 2nd slot | | | 3rd slot | | |
|---|---|---|---|---|---|---|---|---|---|
| | | R0 | R1 | | R2 | R3 | | R4 | R5 |
| N | ld<br>01010110000000100001 | 00000 | 00001 | sub1<br>11000000001010001 | 00010 | 00011 | add1<br>11000000001011000001 | 00100 | 00101 |
| | | R5 | R8 | | R2 | R3 | | R0 | R10 |
| N+1 | st<br>01010101000000100011 | 00101 | 01000 | mul1<br>10001000110001000001 | 00010 | 00011 | mod<br>11001000110100000001 | 00000 | 01010 |

FIG. 47A

| Cycle | 1st slot | | | | 2nd slot | | | | 3rd slot | | | |
|---|---|---|---|---|---|---|---|---|---|---|---|---|
| N+1 | st | R5 | R8 | 010101010100000010000 1:00101:01000 | mul1 | R2 | R3 | 100010001100010000010000:00010:00011 | mod | R0 | R10 | 110010001101000000001:00000:01010 |

FIG. 47B

| Cycle | 1st slot | | | | 2nd slot | | | | 3rd slot | | | |
|---|---|---|---|---|---|---|---|---|---|---|---|---|
| N+1 | st | R5 | R8 | 010101010100000010000 1:00101:01000 | mod | R0 | R10 | 110010001101000000001:00000:01010 | mul1 | R2 | R3 | 100010001100010000010000:00010:00011 |

FIG. 47C

| Cycle | 1st slot | | | | 2nd slot | | | | 3rd slot | | | |
|---|---|---|---|---|---|---|---|---|---|---|---|---|
| N+1 | mul1 | R2 | R3 | 100010001100010000010000:00010:00011 | st | R5 | R8 | 010101010100000010000 1:00101:01000 | mod | R0 | R10 | 110010001101000000001:00000:01010 |

FIG. 47D

| Cycle | 1st slot | | | | 2nd slot | | | | 3rd slot | | | |
|---|---|---|---|---|---|---|---|---|---|---|---|---|
| N+1 | mul1 | R2 | R3 | 100010001100010000010000:00010:00011 | mod | R0 | R10 | 110010001101000000001:00000:01010 | st | R5 | R8 | 010101010100000010000 1:00101:01000 |

FIG. 47E

| Cycle | 1st slot | | | | 2nd slot | | | | 3rd slot | | | |
|---|---|---|---|---|---|---|---|---|---|---|---|---|
| N+1 | mod | R0 | R10 | 110010001101000000001:00000:01010 | st | R5 | R8 | 010101010100000010000 1:00101:01000 | mul1 | R2 | R3 | 100010001100010000010000:00010:00011 |

FIG. 47F

| Cycle | 1st slot | | | | 2nd slot | | | | 3rd slot | | | |
|---|---|---|---|---|---|---|---|---|---|---|---|---|
| N+1 | mod | R0 | R10 | 110010001101000000001:00000:01010 | mul1 | R2 | R3 | 100010001100010000010000:00010:00011 | st | R5 | R8 | 010101010100000010000 1:00101:01000 |

FIG. 48

| Cycle | 1st slot | | | 2nd slot | | | 3rd slot | | |
|---|---|---|---|---|---|---|---|---|---|
| N | ld<br>0101011000000010001 | R0<br>00000 | R1<br>00001 | sub1<br>110000000100101010001 | R2<br>00010 | R3<br>00011 | add1<br>11000000001011100001 | R4<br>00100 | R5<br>00101 |
| N+1 | mod<br>110010001101010000001 | R0<br>00000 | R10<br>01010 | mul1<br>100010001100010000001 | R2<br>00010 | R3<br>00011 | st<br>01010101010001000011 | R5<br>00101 | R8<br>01000 |

Number of register fields with the same register numbers → 1

Number of register fields with the same register numbers → 2

Number of register fields with the same register numbers → 0

COMPILER APPARATUS AND METHOD OF OPTIMIZING A SOURCE PROGRAM BY REDUCING A HAMMING DISTANCE BETWEEN TWO INSTRUCTIONS

BACKGROUND OF THE INVENTION (1) Field of the Invention

The present invention relates to a compiler for converting a source program described in a high-level language such as C/C++language into a machine language program, and particularly to a compiler that is capable of outputting a machine language program which can be executed with lower power consumption.

(2) Description of the Related Art

Mobile information processing apparatuses such as mobile phones and personal digital assistants (PDA), which have become widespread in recent years, require reduction of power consumption. Therefore, there is an increasing demand to develop a compiler that is capable of exploiting effectively high functions of a processor used in an information processing apparatus and generating machine-level instructions that can be executed by the processor with low power consumption.

As a conventional compiler, an instruction sequence optimization apparatus for reducing power consumption of a processor by changing execution order of instructions has been disclosed in Japanese Laid-Open Patent Application No. 8-101777.

This instruction sequence optimization apparatus permutes the instructions so as to reduce hamming distances between bit patterns of the instructions without changing dependency between the instructions. Accordingly, it can realize optimization of an instruction sequence, which brings about reduction of power consumption of a processor.

However, the conventional instruction sequence optimization apparatus does not suppose a processor that can execute parallel processing. Therefore, there is a problem that the optimum instruction sequence cannot be obtained even if the conventional optimization processing is applied to the processor with parallel processing capability.

SUMMARY OF THE INVENTION

The present invention has been conceived in view of the above, and aims to provide a compiler that is capable of generating instruction sequences that can be executed by a processor with parallel processing capability and low power consumption.

In order to achieve the above object, the compiler apparatus according to the present invention is a compiler apparatus that translates a source program into a machine language program for a processor including a plurality of execution units which can execute instructions in parallel and a plurality of instruction issue units which issue the instructions executed respectively by the plurality of execution units. The compiler apparatus includes a parser unit operable to parse the source program, and an intermediate code conversion unit operable to convert the parsed source program into intermediate codes. The compiler apparatus also includes an optimization unit operable to optimize the intermediate codes so as to reduce a hamming distance between instructions placed in positions corresponding to the same instruction issue unit in consecutive instruction cycles, without changing dependency between the instructions corresponding to the intermediate codes. Further, the compiler apparatus includes a code generation unit operable to convert the optimized intermediate codes into machine language instructions. Preferably, the optimization unit optimizes the intermediate codes by placing an instruction with higher priority in a position corresponding to each of the plurality of instruction issue units, without changing dependency between the instructions corresponding to the intermediate codes, the instruction with higher priority having a smaller hamming distance from an instruction being placed in a position corresponding to the same instruction issue unit in an immediately preceding cycle.

Accordingly, since it is possible to restrain change in bit patterns of instructions executed by each execution unit, bit change in values held in instruction registers of a processor is kept small, and thus an instruction sequence that can be executed by the processor with low power consumption is generated.

The compiler apparatus according to another aspect of the present invention is a compiler apparatus that translates a source program into a machine language program for a processor including a plurality of execution units which can execute instructions in parallel and a plurality of instruction issue units which issue the instructions executed respectively by the plurality of execution units. The compiler apparatus includes a parser unit operable to parse the source program, and an intermediate code conversion unit operable to convert the parsed source program into intermediate codes. The compiler apparatus also includes an optimization unit operable to optimize the intermediate codes so that a same register is accessed in consecutive instruction cycles, without changing dependency between instructions corresponding to the intermediate codes, and includes a code generation unit operable to convert the optimized intermediate codes into machine language instructions. Preferably, the optimization unit optimizes the intermediate codes by placing an instruction with higher priority in a position corresponding to each of the plurality of instruction issue units, without changing dependency between the instructions corresponding to the intermediate codes, the instruction with higher priority being for accessing a register of an instruction placed in a position corresponding to the same instruction issue unit in an immediately preceding instruction cycle.

Accordingly, access to one register is repeated and change in a control signal for selecting a register becomes small, and thus an instruction sequence that can be executed by the processor with low power consumption is generated.

The compiler apparatus according to still another aspect of the present invention is a compiler apparatus that translates a source program into a machine language program for a processor including a plurality of execution units which can execute instructions in parallel and a plurality of instruction issue units which issue the instructions executed respectively by the plurality of execution units, wherein an instruction which is to be issued with higher priority is predetermined for each of the plurality of instruction issue units. The compiler apparatus includes a parser unit operable to parse the source program, and an intermediate code conversion unit operable to convert the parsed source program into intermediate codes. The compiler apparatus also includes an optimization unit operable to optimize the intermediate codes by placing the predetermined instruction with higher priority in a position corresponding to each of the plurality of instruction issue units, without changing dependency between instructions corresponding to the intermediate codes, and includes a code generation unit operable to convert the optimized intermediate codes into machine language instructions.

Accordingly, if instructions using the same constituent element of a processor are assigned as instructions to be issued by priority by the same instruction issue unit, the instructions using the same constituent element are executed consecutively in the same execution unit. Therefore, an instruction sequence that can be executed by the processor with low power consumption is generated.

The compiler apparatus according to still another aspect of the present invention is a compiler apparatus that translates a source program into a machine language program for a processor including a plurality of execution units which can execute instructions in parallel and a plurality of instruction issue units which issue the instructions executed respectively by the plurality of execution units. The compiler apparatus includes a parser unit operable to parse the source program, and an intermediate code conversion unit operable to convert the parsed source program into intermediate codes. The compiler apparatus also includes an interval detection unit operable to detect an interval in which no instruction is placed in a predetermined number of positions, out of a plurality of positions corresponding respectively to the plurality of instruction issue units in which instructions are to be placed, consecutively for a predetermined number of instruction cycles. Further, the compiler apparatus includes a first instruction insertion unit operable to insert, into immediately before the interval, an instruction to stop an operation of the instruction issue units corresponding to the positions where no instruction is placed, and includes a code generation unit operable to convert the optimized intermediate codes into machine language instructions.

Accordingly, when instructions are not placed in a location corresponding to the instruction issue unit for a certain interval, power supply to the instruction issue unit can be stopped during that interval. Therefore, an instruction sequence that can be executed by the processor with low power consumption is generated.

The compiler apparatus according to still another aspect of the present invention is a compiler apparatus that translates a source program into a machine language program for a processor including a plurality of execution units which can execute instructions in parallel and a plurality of instruction issue units which issue the instructions executed respectively by the plurality of execution units. The compiler apparatus includes a parser unit operable to parse the source program, and an intermediate code conversion unit operable to convert the parsed source program into intermediate codes. The compiler apparatus also includes an optimization unit operable to optimize the intermediate codes by placing instructions so as to operate only a specified number of instruction issue units, without changing dependency between the instructions corresponding to the intermediate codes, and includes a code generation unit operable to convert the optimized intermediate codes into machine language instructions. Preferably, the source program includes unit number specification information specifying the number of instruction issue units used by the processor, and the optimization unit optimizes the intermediate codes by placing the instructions so as to operate only the instruction issue units of the number specified by the unit number specification information, without changing dependency between the instructions corresponding to the intermediate codes.

Thus, according to the instructions specified by the number specification information, the optimization unit can generate an instruction issue unit to which no instruction is issued and stop power supply to that instruction issue unit. Therefore, an instruction sequence, that can be executed by the processor with low power consumption, is generated.

More preferably, the above-mentioned compiler apparatus further comprises an acceptance unit operable to accept the number of instruction issue units used by the processor, wherein the optimization unit optimizes the intermediate codes by placing the instructions so as to operate only the instruction issue units of the number accepted by the acceptance unit, without changing dependency between the instructions corresponding to the intermediate codes.

Accordingly, it is possible to operate only the instruction issue units of the number accepted by the acceptance unit and to stop power supply to other instruction issue units. Therefore, an instruction sequence that can be executed by the processor with low power consumption is generated.

It should be noted that the present invention can be realized not only as the compiler apparatus as mentioned above, but also as a compilation method including steps executed by the units included in the compiler apparatus, and as a program for this characteristic compiler or a computer-readable recording medium. It is needless to say that the program and data file can be widely distributed via a recording medium such as a CD-ROM (Compact Disc-Read Only Memory) and a transmission medium such as the Internet.

As is obvious from the above explanation, the compiler apparatus according to the present invention restrains bit change in values held in an instruction register of a processor, and thus an instruction sequence that can be executed by the processor with low power consumption is generated.

Also, access to one register is repeated and a change in a control signal for selecting a register becomes small, and thus an instruction sequence, that can be executed by the processor with low power consumption, is generated.

Also, since the instructions using the same constituent element can be executed in the same slot consecutively for certain cycles, an instruction sequence, that can be executed by the processor with low power consumption, is generated.

Furthermore, since power supply to a free slot can be stopped, an instruction sequence, that can be executed by the processor with low power consumption, is generated.

As described above, the compiler apparatus according to the present invention allows a processor with parallel processing capability to operate with low power consumption. Particularly, it is possible to generate instruction sequences (a machine language program) suitable for a processor used for an apparatus that is required for low-power operation, like a mobile information processing apparatus such as a mobile phone, a PDA or the like, so the practical value of the present invention is extremely high.

As further information about technical background to this application, Japanese Patent Application No. 2003-019365 filed on Jan. 28, 2003 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 11 is a diagram showing instructions executed by the processor, the details of the processing and the bit patterns of the instructions;

FIG. 15 is a diagram showing an example of a result of instruction scheduling;

FIG. 16 is a flowchart showing operations of optimum instruction fetching processing as shown in FIG. 13;

FIG. 17A and FIG. 17B are diagrams for explaining how to calculate a hamming distance between bit patterns in operation codes;

FIG. 18A and FIG. 18B are diagrams for explaining how to calculate a hamming distance between operation codes with different bit lengths;

FIG. 20A~FIG. 20F are diagrams showing an example of six patterns of instruction sequences;

FIG. 21 is a diagram showing an example of placed instructions;

FIG. 22A~FIG. 22F are diagrams for explaining processing for creating instruction sequences (S61 in FIG. 19);

FIG. 23 is a diagram for explaining processing for calculating hamming distances between operation codes (S64 in FIG. 19);

FIG. 29 is a flowchart showing operations of optimum instruction fetching processing in FIG. 28;

FIG. 30A and FIG. 30B are diagrams for explaining processing for specifying placement candidate instructions (S152 in FIG. 29);

FIG. 31A and FIG. 31B are diagrams for explaining processing for specifying placement candidate instructions (S156 in FIG. 29);

FIG. 32A and FIG. 32B are diagrams for explaining processing for specifying placement candidate instructions (S160 in FIG. 29);

FIG. 40A and FIG. 40B are diagrams for explaining processing for specifying a placement candidate instruction (S212 in FIG. 39);

FIG. 42 is a diagram for explaining processing for calculating a hamming distance between instructions (S222 in FIG. 41);

FIG. 44 is a diagram for explaining processing for calculating a hamming distance between register fields (S232 in FIG. 43);

FIG. 46 is a diagram showing an example of placed instructions;

FIG. 47A~FIG. 47F are diagrams for explaining processing for creating instruction sequences (S61 in FIG. 45);

FIG. 48 is a diagram for explaining processing for calculating the numbers of register fields (S242 in FIG. 45)

DETAILED DESCRIPTION OF THE INVENTION

Figure 1A:
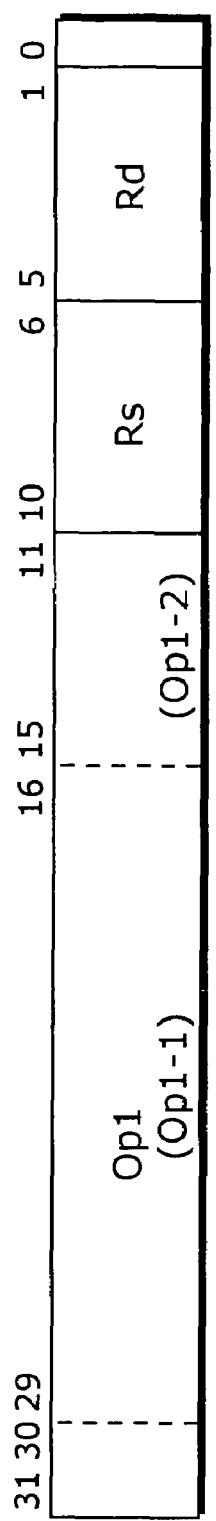
FIG. 1A~FIG. 1D are diagrams showing structures of instructions decoded and executed by a processor in the present embodiment.
Figure 1B:
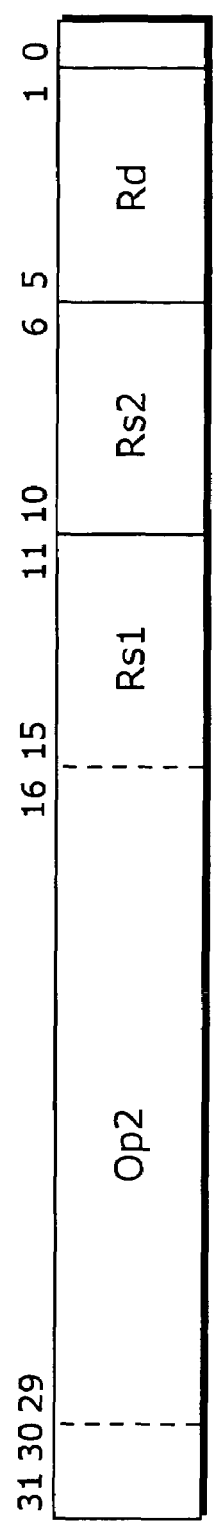
Figure 1C:
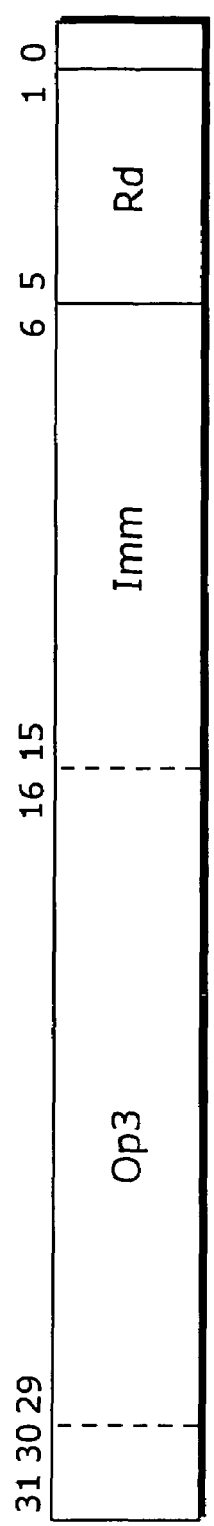
Figure 1D:
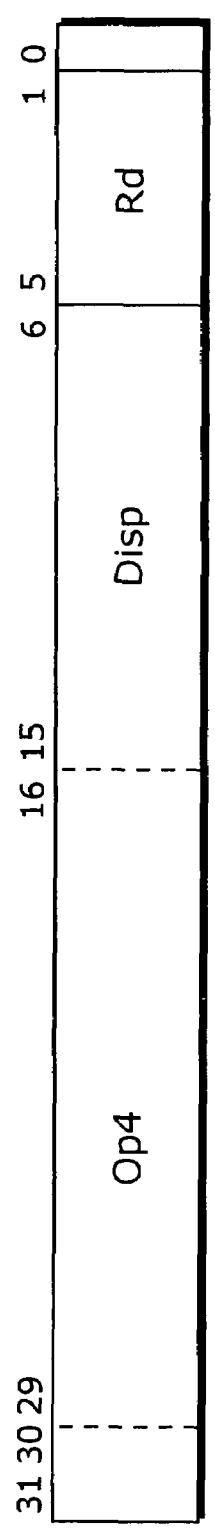

The embodiment of the compiler according to the present invention will be explained in detail referring to the drawings.

The compiler in the present embodiment is a cross compiler for translating a source program described in a high-level language such as C/C++ language into a machine language that can be executed by a specific processor (target), and has a feature of reducing power consumption of a processor.

(Processor)

First, an example of a processor realized by the compiler in the present embodiment will be explained referring to FIG. 1A~FIG. 11.

A pipeline system having higher parallelity of executable instructions than that of a microcomputer is used for the processor realized by the compiler in the present embodiment so as to execute a plurality of instructions in parallel.

FIG. 1A~FIG. 1D are diagrams showing structures of instructions decoded and executed by the processor in the present embodiment. As shown in FIG. 1A~FIG. 1D, each instruction executed by the processor has a fixed length of 32 bits. The 0th bit of each instruction indicates parallel execution boundary information. When the parallel execution boundary information is "1", there exists a boundary of parallel execution between the instruction and the subsequent instructions. When the parallel execution boundary information is "0", there exists no boundary of parallel execution. How to use the parallel execution boundary information will be described later.

Operations are determined in 31 bits excluding parallel execution boundary information from the instruction length of each instruction. More specifically, in fields "Op1", "Op2", "Op3" and "Op4", operation codes indicating types of operations are specified. In register fields "Rs", "Rs1" and "Rs2", register numbers of registers that are source operands are specified. In a register field "Rd", a register number of a register that is a destination operand is specified. In a field "Imm", a constant operand for operation is specified. In a field "Disp", displacement is specified.

The first 2 bits (30th and 31st bits) of an operation code are used for specifying a type of operations (a set of operations). The detail of these two bits will be described later.

The operation codes Op2~Op4 are data of 16-bit length, while the operation code Op1 is data of 21-bit length. Therefore, for convenience, the first half (16th~31st bits) of the operation code Op1 is called an operation code Op1-1, while the second half (11th~15th bits) thereof is called an operation code Op1-2.

Figure 2:
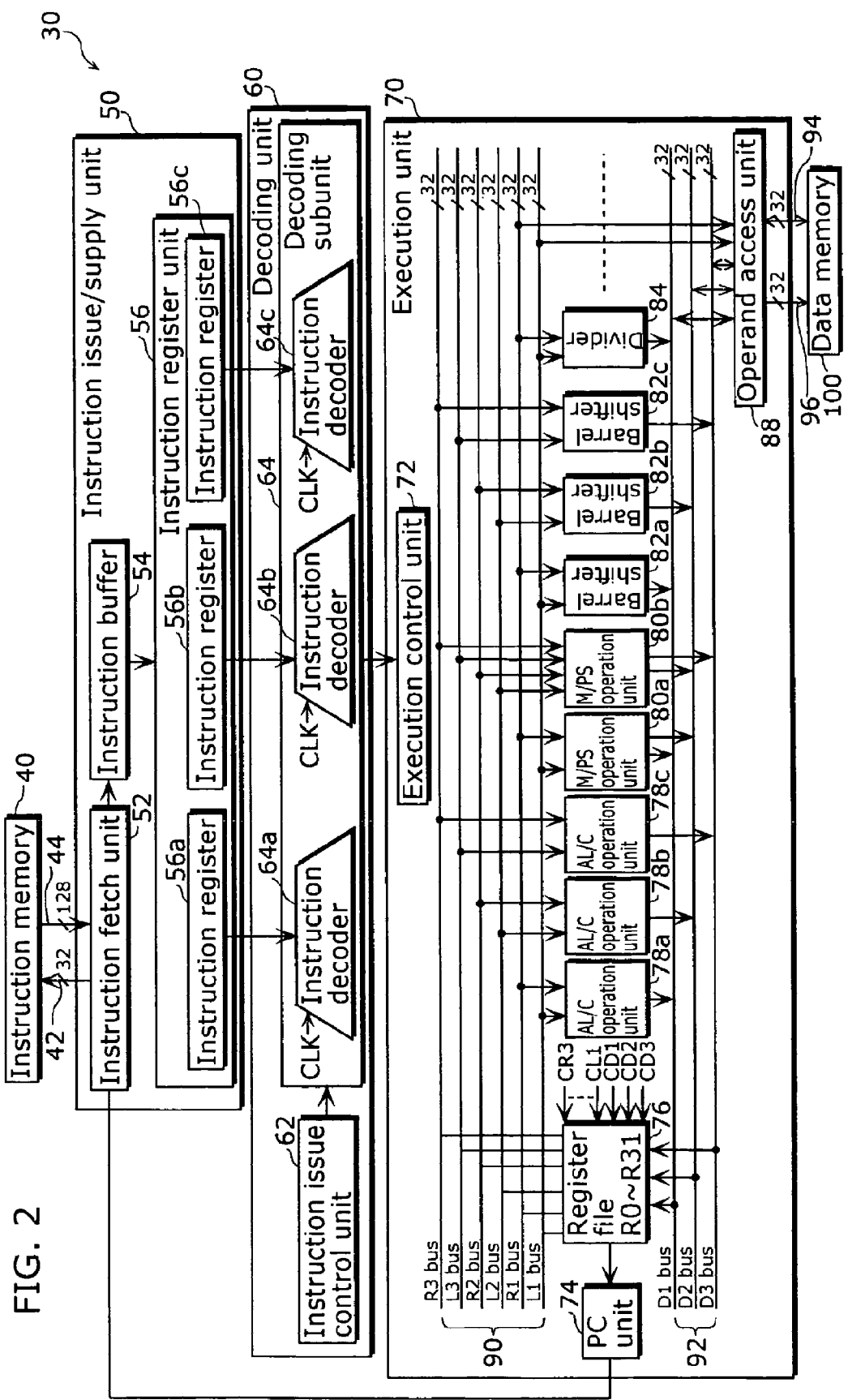
FIG. 2 is a block diagram showing a schematic structure of the processor in the present embodiment.

FIG. 2 is a block diagram showing a schematic structure of a processor in the present embodiment. A processor 30 includes an instruction memory 40 for storing sets of instructions (hereinafter referred to as "packets") described according to VLIW (Very Long Instruction Word), an instruction supply/issue unit 50, a decoding unit 60, an execution unit 70 and a data memory 100. Each of these units will be described in detail later.

Figure 3:
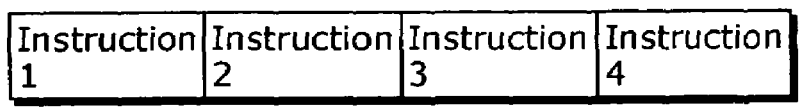
FIG. 3 is a diagram showing an example of a packet.

FIG. 3 is a diagram showing an example of a packet. It is defined that one packet is the unit of an instruction fetch and is made up of four instructions. As mentioned above, one instruction is 32-bit length. Therefore, one packet is 128 (=32×4) bit length.

Again referring to FIG. 2, the instruction supply/issue unit 50 is connected to the instruction memory 40, the decoding unit 60 and the execution unit 70, and receives packets from the instruction memory 40 based on a value of a PC (program counter) supplied from the execution unit 70 and issues three or less instructions in parallel to the decoding unit 60.

The decoding unit 60 is connected to the instruction supply/issue unit 50 and the execution unit 70, and decodes the instructions issued from the instruction supply/issue unit 50 and issues the decoded ones to the execution unit 70.

The execution unit 70 is connected to the instruction supply/issue unit 50, the decoding unit 60 and the data memory 100, and accesses data stored in the data memory 100 if necessary and executes the processing according to the instructions, based on the decoding results supplied from the decoding unit 60. The execution unit 70 increments the value of the PC one by one every time the processing is executed.

The instruction supply/issue unit 50 includes: an instruction fetch unit 52 that is connected to the instruction memory 40 and a PC unit to be described later in the execution unit 70, accesses an address in the instruction memory 40 indicated by the program counter held in the PC unit, and receives packets from the instruction memory 40; an instruction buffer 54 that is connected to the instruction fetch unit 52 and holds the packets temporarily; and an instruction register unit 56 that is connected to the instruction buffer 54 and holds three or less instructions included in each packet.

The instruction fetch unit 52 and the instruction memory 40 are connected to each other via an IA (Instruction Address) bus 42 and an ID (Instruction Data) bus 44. The IA bus 42 is 32-bit width and the ID bus 44 is 128-bit width. Addresses are supplied from the instruction fetch unit 52 to the instruction memory 40 via the IA bus 42. Packets are supplied from the instruction memory 40 to the instruction fetch unit 52 via the ID bus 44.

The instruction register unit 56 includes instruction registers 56a~56c that are connected to the instruction buffer 54 respectively and hold one instruction respectively.

The decoding unit 60 includes: an instruction issue control unit 62 that controls issue of the instructions held in the three instruction registers 56a~56c in the instruction register unit 56; and a decoding subunit 64 that is connected to the instruction issue control unit 62 and the instruction register unit 56, and decodes the instructions supplied from the instruction register unit 56 under the control of the instruction issue control unit 62.

The decoding subunit 64 includes instruction decoders 64a~64c that are connected to the instruction registers 56a~56c respectively, and basically decode one instruction in one cycle for outputting control signals.

The execution unit 70 includes: an execution control unit 72 that is connected to the decoding subunit 64 and controls each constituent element of the execution unit 70 to be described later based on the control signals outputted from the three instruction decoders 64a~64c in the decoding subunit 64; a PC unit 74 that holds an address of a packet to be executed next; a register file 76 that is made up of 32 registers of 32 bits R0~R31; arithmetic and logical/comparison operation units (AL/C operation units) 78a~78c that execute operations of SIMD (Single Instruction Multiple Data) type instructions; and multiplication/product-sum operation units (M/PS operation units) 80a and 80b that are capable of executing SIMD type instructions like the arithmetic and logical/comparison operation units 78a~78c and calculate a result of 65-bit or less length without lowering the bit precision.

The execution unit 70 further includes: barrel shifters 82a~82c that execute arithmetic shifts (shifts of complement number system) or logic shifts (unsigned shifts) of data respectively; a divider 84; an operand access unit 88 that is connected to the data memory and sends and receives data to and from the data memory 100; data buses 90 of 32-bit width (an L1 bus, an R1 bus, an L2 bus, an R2 bus, an L3 bus and an R3 bus); and data buses 92 of 32-bit width (a D1 bus, a D2 bus and a D3 bus).

The register file 76 includes 32 registers of 32 bits R0~R31. The registers in the register file 76 for outputting data to the L1 bus, the R1 bus, the L2 bus, the R2 bus, the L3 bus and the R3 bus are selected, respectively, based on the control signals CL1, CR1, CL2, CR2, CL3 and CR3 supplied from the execution control unit 72 to the register file 76. The registers in which data transmitted through the D1 bus, the D2 bus and the D3 bus are written are selected, respectively, based on the control signals CD1, CD2 and CD3 supplied from the execution control unit 72 to the register file 76.

Two input ports of the arithmetic and logical/comparison operation unit 78a are respectively connected to the L1 bus and the R1 bus, and the output port thereof is connected to the D1 bus. Two input ports of the arithmetic and logical/comparison operation unit 78b are respectively connected to the L2 bus and the R2 bus, and the output port thereof is connected to the D2 bus. Two input ports of the arithmetic and logical/comparison operation unit 78c are respectively connected to the L3 bus and the R3 bus, and the output port thereof is connected to the D3 bus.

Four input ports of the multiplication/product-sum operation unit 80a are respectively connected to the L1 bus, the R1 bus, the L2 bus and the R2 bus, and the two output ports thereof are respectively connected to the D1 bus and the D2 bus. Four input ports of the multiplication/product-sum operation unit 80b are respectively connected to the L2 bus, the R2 bus, the L3 bus and the R3 bus, and the two output ports thereof are respectively connected to the D2 bus and the D3 bus.

Two input ports of the barrel shifter 82a are respectively connected to the L1 bus and the R1 bus, and the output port thereof is connected to the D1 bus. Two input ports of the barrel shifter 82b are respectively connected to the L2 bus and the R2 bus, and the output port thereof is connected to the D2 bus. Two input ports of the barrel shifter 82c are respectively connected to the L3 bus and the R3 bus, and the output port thereof is connected to the D3 bus.

Two input ports of the divider 84 are respectively connected to the L1 bus and the R1 bus, and the output port thereof is connected to the D1 bus.

The operand access unit 88 and the data memory 100 are connected to each other via an OA (Operand Address) bus 96 and an OD (Operand Data) bus 94. The OA bus 96 and the OD bus 94 are each 32-bits. The operand access unit 88 further specifies an address of the data memory 100 via the OA bus 96, and reads and writes data at that address via the OD bus 94.

The operand access unit 88 is also connected to the D1bus, the D2 bus, the D3 bus, the L1 bus and the R1 bus and sends and receives data to and from any one of these buses.

The processor 30 is capable of executing three instructions in parallel. As described later, a collection of circuits that are capable of executing a set of pipeline processing including an instruction assignment stage, a decoding stage, an execution stage and a writing stage that are executed in parallel is defined as a "slot" in the present description. Therefore, the processor 30 has three slots, the first, second and the third slots. A set of the processing executed by the instruction register 56a and the instruction decoder 64a belongs to the first slot, a set of the processing executed by the instruction register 56b and the instruction decoder 64b belongs to the second slot, and a set of the processing executed by the instruction register 56c and the instruction decoder 64c belongs to the third slot, respectively.

Instructions called default logics are assigned to respective slots, and the instruction scheduling is executed so that the same instructions are executed in the same slot if possible. For example, instructions (default logics) regarding memory access are assigned to the first slot, default logic regarding multiplication are assigned to the second slot, and other default logic is assigned to the third slot. Note that a default logic corresponds one to one to a set of operations explained referring to FIG. 1A·FIG. 1D. In other words, instructions with the first 2 bits of "01", "10" and "11" indicates default logic for the first, second and third slots, respectively.

Default logic for the first slot includes "ld" (load instruction), "st" (store instruction) and the like. Default logic for the second slot includes "mul1", "mul2" (multiplication instructions) and the like. Default logic for the third slot includes "add1", "add2" (addition instructions), "sub1", "sub2" (subtraction instructions), "mov1", "mov2" (transfer instructions between registers) and the like.

Figure 4:
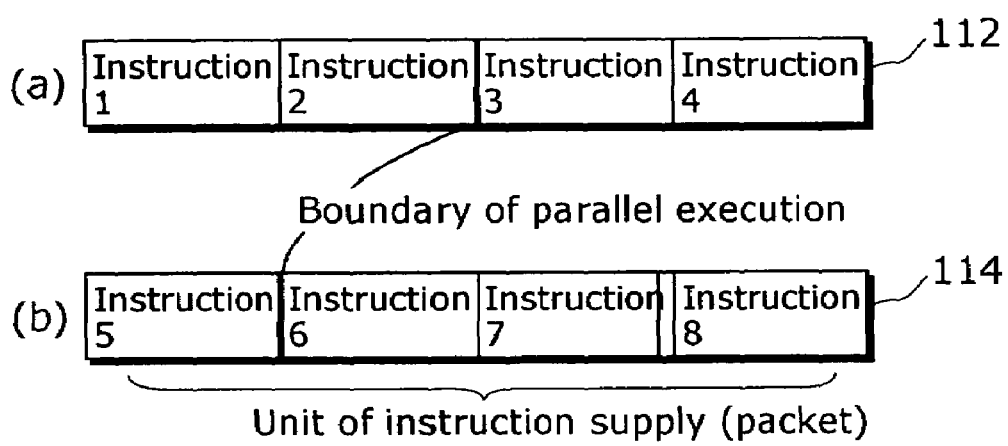
FIGS. 4 ((a) and (b)) are diagrams for explaining parallel execution boundary information included in a packet.

FIG. 4 is a diagram for explaining parallel execution boundary information included in a packet. It is assumed that a packet 112 and a packet 114 are stored in the instruction memory 40 in this order. It is also assumed that the parallel execution boundary information for the instruction 2 in the packet 112 and the instruction 5 in the packet 114 are "1" and the parallel execution boundary information for other instructions are "0".

The instruction fetch unit 52 reads the packet 112 and the packet 114 in this order based on values of the program counter in the PC unit 74, and issues them to the instruction buffer 54 in sequence. The execution unit 70 executes, in parallel, the instructions up to the instruction whose parallel execution boundary information is 1.

Figure 5A:
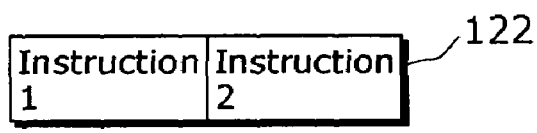
FIGS. 5A~5C are diagrams showing examples of the unit of executing instructions which are created based on parallel execution boundary information of a packet and executed in parallel.
Figure 5B:
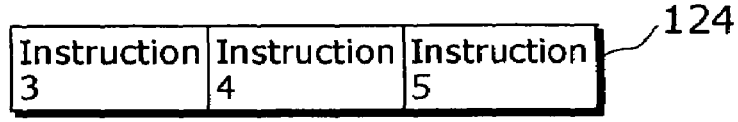
Figure 5C:
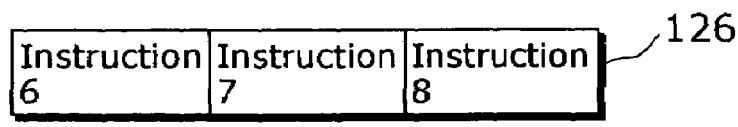

FIGS. 5A~5C are diagrams showing an example of the unit of executing instructions which are created based on parallel execution boundary information of a packet and executed in parallel. Referring to FIG. 4 and FIGS. 5A~5C, by separating the packet 112 and the packet 114 at the position of the instructions whose parallel execution boundary information is "1", the units of execution 122~126 are generated. Therefore, instructions are issued from the instruction buffer 54 to the instruction register unit 56 in order of the units of execution 122~126. The instruction issue control unit 62 controls issue of these instructions.

The instruction decoders 64a~64c respectively decode the operation codes of the instructions held in the instruction registers 56a~56c, and output the control signals to the execution control unit 72. The execution control unit 72 exercises various types of control on the constituent elements of the execution unit 70 based on the analysis results in the instruction decoders 64a~4c.

Take an instruction "add1 R3, R0" as an example. This instruction means to add the value of the register R3 and the value of the register R0 and write the addition result in the register R0. In this case, the execution control unit 72 exercises the following control as an example. The execution control unit 72 supplies to the register file 76 a control signal CL1 for outputting the value held in the register R3 to the L1 bus. Also, the execution control unit 72 supplies to the register file 76 a control signal CR1 for outputting the value held in the register R0 to the R1bus.

The execution control unit 72 further supplies to the register file 76 a control signal CD1 for writing the execution result obtained via the D1 bus into the register R0. The execution control unit 72 further controls the arithmetic and logical/comparison operation unit 78a, receives the values of the register R3 and the R0 via the L1 bus and the L2 bus, adds them, and then writes the addition result in the register R0 via the D1 bus.

Figure 6:
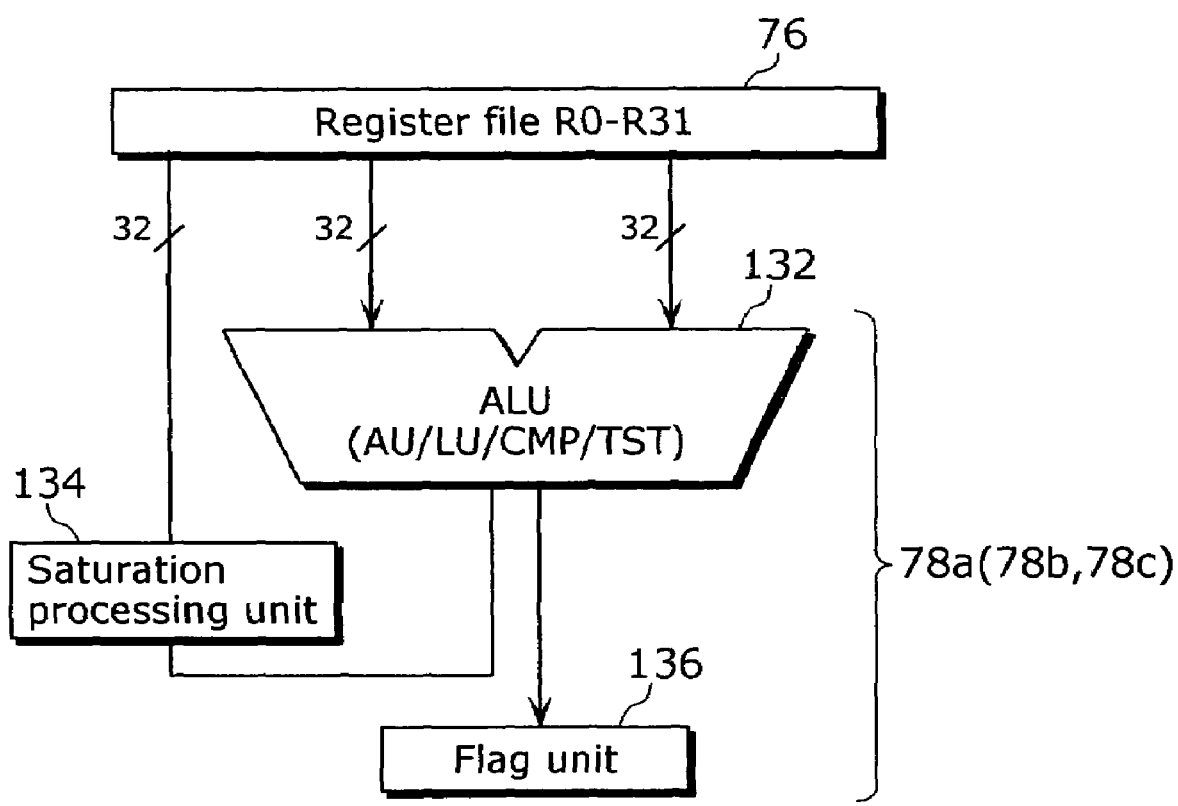
FIG. 6 is a block diagram showing a schematic structure of an arithmetic and logical/comparison operation unit.

FIG. 6 is a block diagram showing a schematic structure of each of the arithmetic and logical/comparison operation units 78a~78c. Referring to FIG. 6 and FIG. 2, each of the arithmetic and logical/comparison operation units 78a ~78c includes: an ALU (Arithmetic and Logical Unit) 132 which is connected to the register file 76 via the data bus 90; a saturation processing unit 134 which is connected to the register file 76 via the ALU 132 and the data bus 92 and executes processing such as saturation, maximum/minimum value detection and absolute value generation; and a flag unit 136 which is connected to the ALU 132 and detects overflows and generates condition flags.

Figure 7:
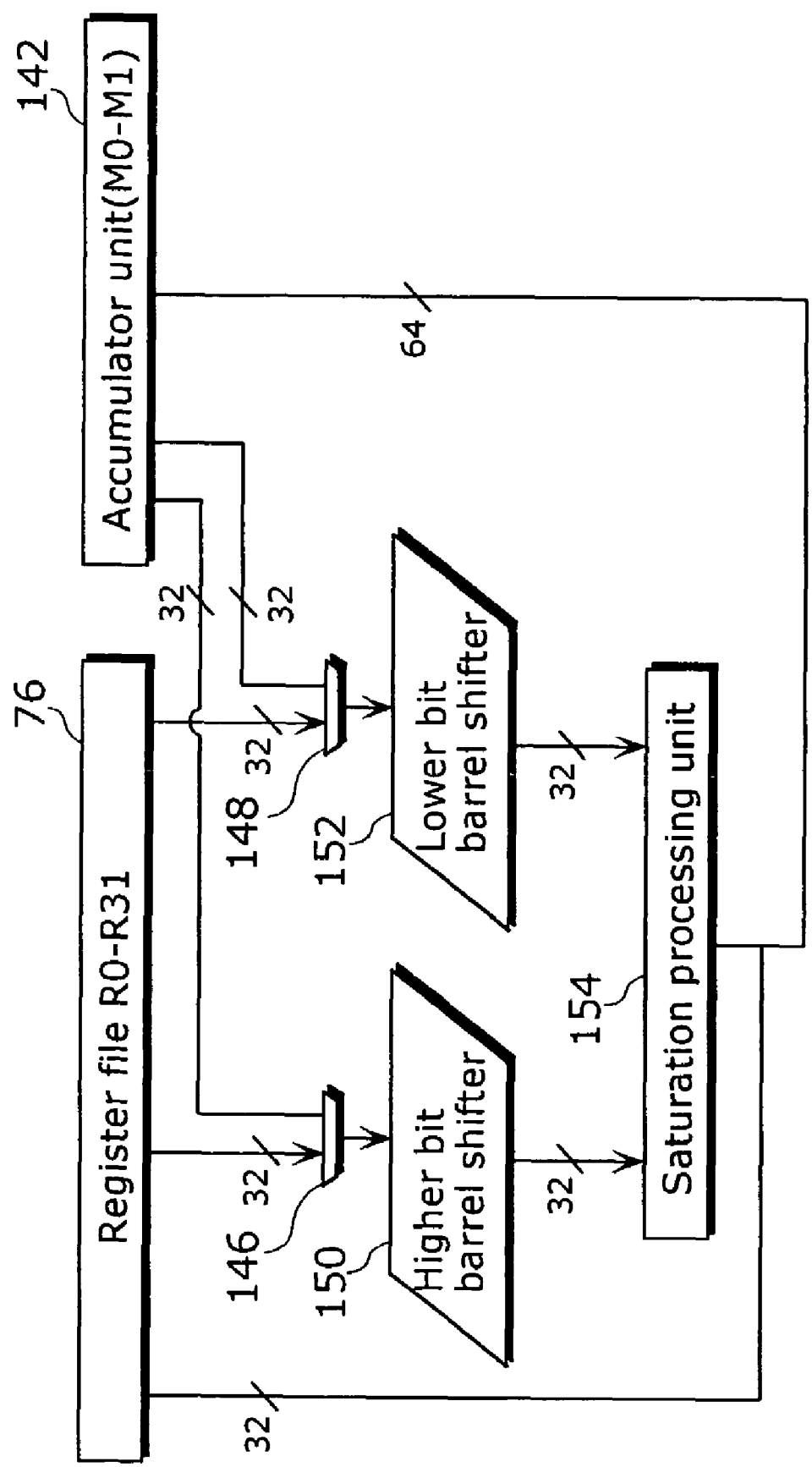
FIG. 7 is a block diagram showing a schematic structure of a barrel shifter.

FIG. 7 is a block diagram showing a schematic structure of each of the barrel shifters 82a~82c. Referring to FIG. 7 and FIG. 2, each of the barrel shifters 82a~82c includes: an accumulator unit 142 having accumulators M0 and M1 for holding 32-bit data; a selector 146 which is connected to the accumulator M0 and the register file 76 via the data bus 90 and receives the values of the accumulator M0 and a register; a selector 148 which is connected to the accumulator M1 and the register file 76 via the data bus 90 and receives the value of the accumulator M1 and a register; a higher bit barrel shifter 150 which is connected to the output of the selector 146; a lower bit barrel shifter 152 which is connected to the output of the selector 148; and a saturation processing unit 154 which is connected to the outputs of the higher bit barrel shifter 150 and the lower bit barrel shifter 152.

The output of the saturation processing unit 154 is connected to the accumulator unit 142 and the register file 76 via the data bus 92.

Each of the barrel shifters 82a~82c executes arithmetic shift (shift in 2's complement system) or logical shift (unsigned shift) of data by operating its own constituent elements. It normally receives or outputs 32-bit or 64-bit data. Shift amount of the data to be shifted, which is stored in the register in the register file 76 or the accumulator in the accumulator unit 142, is specified using the shift amount stored in another register or an immediate value. Arithmetic or logical shift of data is executed within a range between 63 bits to the left and 63 bits to the right, and the data is outputted in bit length the same as the input bit length.

Each of the barrel shifters 82a~82c is capable of shifting 8-bit, 16-bit, 32-bit and 64-bit data in response to a SIMD instruction. For example, it can process four 8-bit data shifts in parallel.

Arithmetic shift, which is a shift in the 2's complement number system, is executed for alignment by decimal points at the time of addition and subtraction, multiplication of a power of 2 (such as twice, the 2nd power of 2, the 1st power of 2, 2nd power of 2) and the like.

Figure 8:
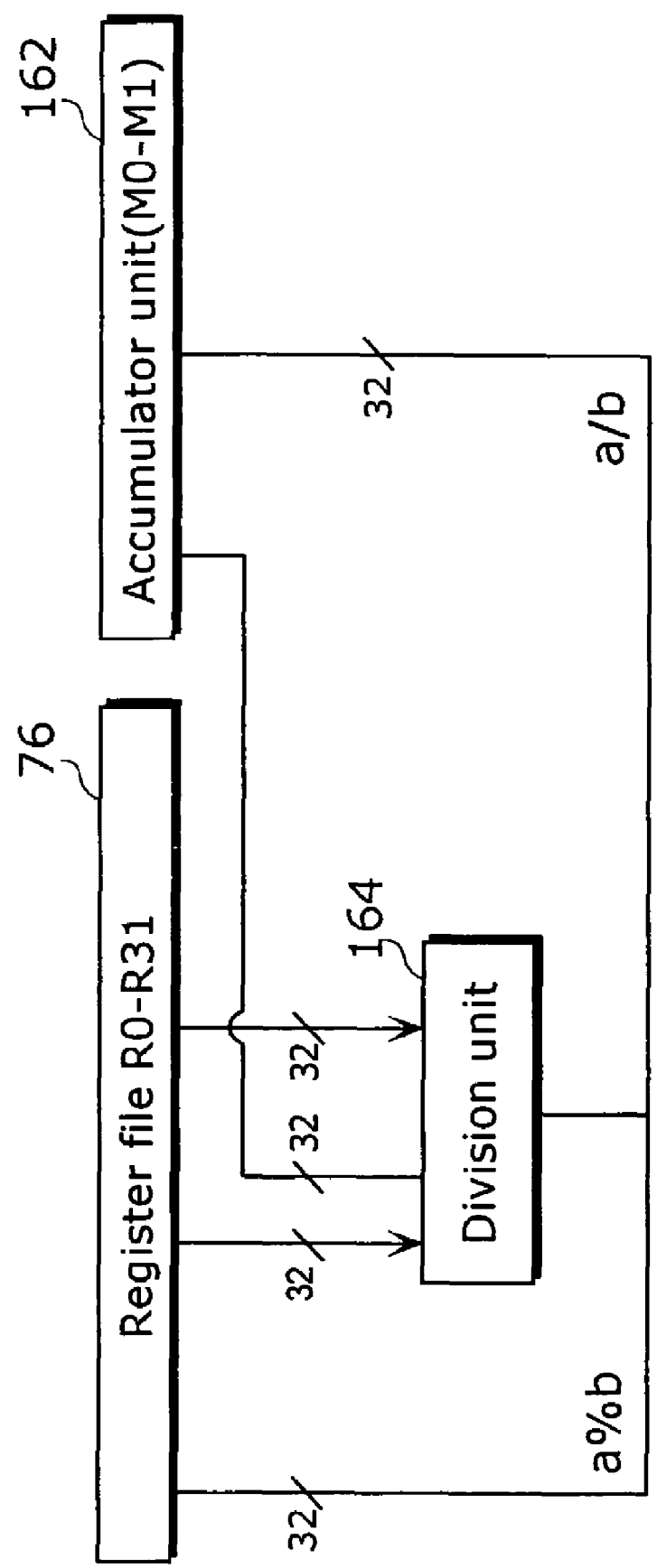
FIG. 8 is a block diagram showing a schematic structure of a divider.

FIG. 8 is a block diagram showing a schematic structure of the divider 84. Referring to FIG. 8 and FIG. 2, the divider 84 includes: an accumulator unit 162 having accumulators M0 and M1 holding 32-bit data; and a division unit 164 which is connected to the register file 76 via the accumulator unit 162 and the data buses 90 and 92.

With a dividend being 64 bits and a divisor being 32 bits, the divider 84 outputs a quotient of 32 bits and a remainder of 32 bits respectively. 34 cycles are involved for obtaining a quotient and a remainder. The divider 84 can handle both signed and unsigned data. However, whether to sign the dividend and divisor or not is determined for both of them in common. The divider 84 further has a function of outputting an overflow flag and a 0 division flag.

Figure 9:
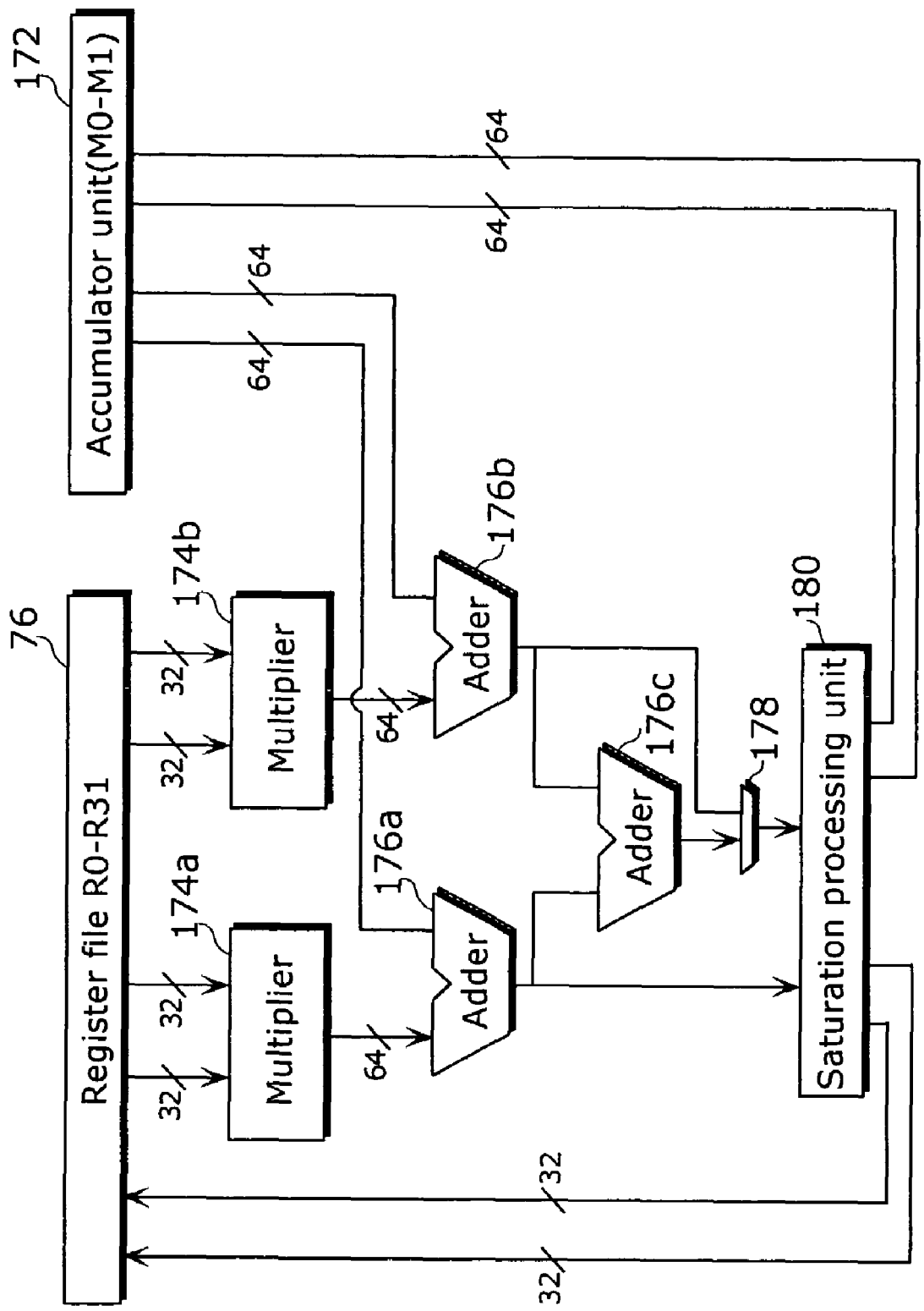
FIG. 9 is a block diagram showing a schematic structure of a multiplication/product-sum operation unit.

FIG. 9 is a block diagram showing a schematic structure of each of the multiplication/product-sum operation units 80a and 80b. Referring to FIG. 9 and FIG. 2, each of the multiplication/product-sum operation units 80a and 80b includes: an accumulator unit 172 having accumulators M0 and M1 holding 64-bit data, respectively; and 32-bit multipliers 174a and 174b having two inputs which are connected to the register file 76 via the data bus 90, respectively.

Each of the multiplication/product-sum operation units 80a and 80b further includes: a 64-bit adder 176a which is connected to the output of the multiplier 174a and the accumulator unit 172; a 64-bit adder 176b which is connected to the output of the multiplier 174b and the accumulator unit 172; a 64-bit adder 176c which is connected to the outputs of the 64-bit adder 176a and the 64-bit adder 176b; a selector 178 which is connected to the outputs of the 64-bit adder 176b and the 64-bit adder 176c; and a saturation processing unit 180 which is connected to the output of the adder 176a, the output of the selector 178, the accumulator unit 172 and the register file 76 via the data bus 92.

Each of the multiplication/product-sum operation units 80a and 80b execute the following multiplication and product-sum operations:

multiplication, product-sum and product-difference operations of 32×32-bit signed data;

multiplication of 32×32-bit unsigned data;

multiplication, product-sum and product-difference operations of two 16×16-bit signed data in parallel; and multiplication, product-sum and product-difference operations of two 32×16-bit signed data in parallel.

The above operations are executed for data in integer and fixed point formats. Also, the results of these operations are rounded and saturated.

Figure 10:
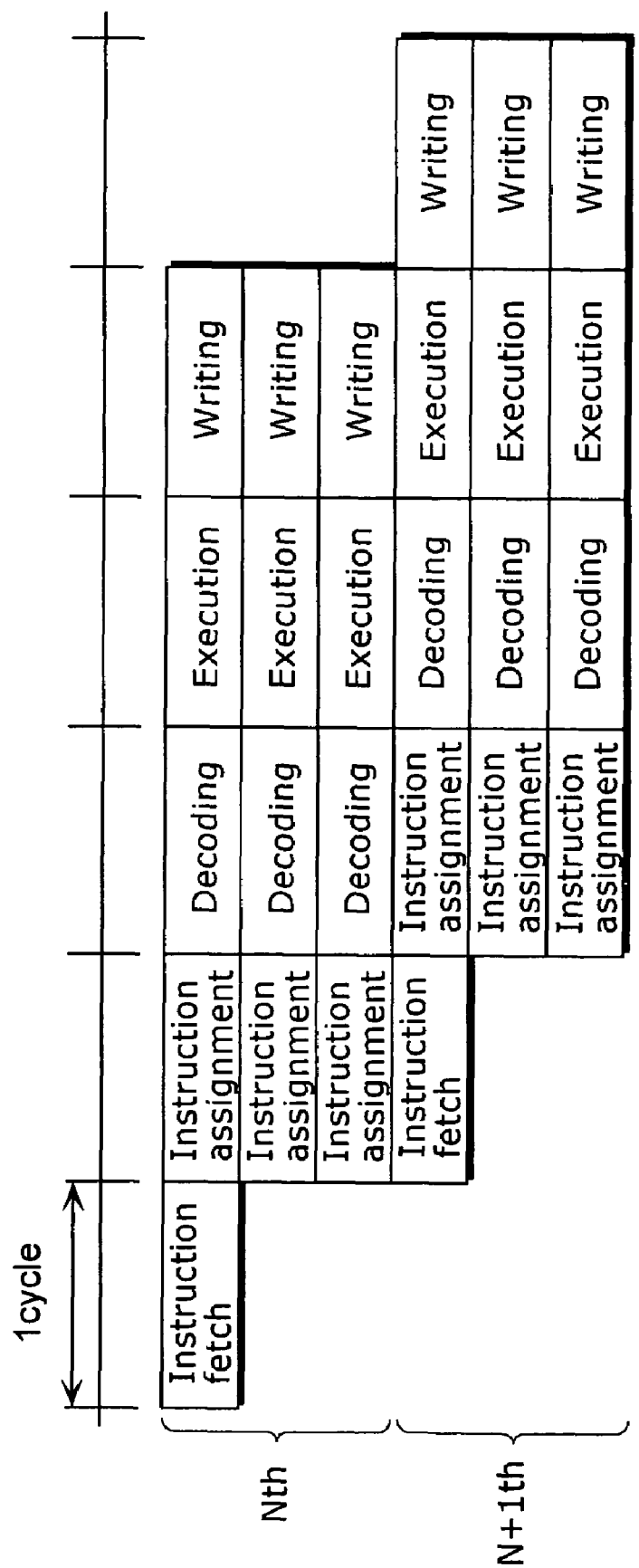
FIG. 10 is a timing diagram showing each pipeline operation performed when the processor executes instructions.

FIG. 10 is a timing diagram showing each pipeline operation executed when the above-mentioned processor 30 executes instructions. Referring to FIG. 2 and FIG. 10, at an instruction fetch stage, the instruction fetch unit 52 accesses the instruction memory 40 at the address specified by the program counter held in the PC unit 74 and transfers packets to the instruction buffer 54. At an instruction assignment stage, the instructions held in the instruction buffer 54 are assigned to the instruction registers 56a~56c. At a decoding stage, the instructions assigned to the instruction registers 56a ~56c are respectively decoded by the instruction decoder 64a~64c under the control of the instruction issue control unit 62. At an operation stage, the execution control unit 72 operates the constituent elements of the execution unit 70 to execute various operations based on the decoding results in the instruction decoder 64a~64c. At a writing stage, the operation results are stored in the data memory 100 or the register file 76. According to these processing, 3 or less pipeline processing can be executed in parallel.

FIG. 11 is a diagram showing instructions executed by the processor 30, the details of the processing and the bit patterns of the instructions. The instruction "ld Rs, Rd" indicates the processing for loading data addressed by a register specified in the Rs field of the instruction (hereinafter referred to as "Register Rs") in the data memory 100 into the register Rd, as shown in FIG. 1A~FIG. 1D. The bit pattern is as shown in FIG. 11.

In each of the bit patterns as shown in FIG. 11, the first 2 bits (30th and 31st bits) are used for specifying a set of operations, and 0th bit is used for specifying parallel execution boundary information. The operation with the first 2 bits of "0" relates to a memory access. The operation with the first 2 bits of "10" relates to multiplication. The operation with the first 2 bits of "11" relates to other processing.

The instruction "st Rs, Rd" indicates the processing for storing a value of the register Rs into a location addressed by the register Rd in the data memory 100.

The instruction "mul1 Rs, Rd" indicates the processing for writing a product between a value of the register Rs and a value of the register Rd into the register Rd. The instruction "mul2 Rs1, Rs2, Rd" indicates the processing for writing a product between a value of the register Rs1 and a value of the register Rs2 into the register Rd.

The instruction "add1 Rs, Rd" indicates the processing for writing a sum between a value of the register Rs and a value of the register Rd into the register Rd. The instruction "add2 Rs1, Rs2, Rd" indicates the processing for writing a sum between a value of the register Rs1 and a value of the register Rs2 into the register Rd.

The instruction "sub1 Rs, Rd" indicates the processing for writing a difference between a value of the register Rs and a value of the register Rd into the register Rd. The instruction "sub2 Rs1, Rs2, Rd" indicates the processing for writing a difference between a value of the register Rs1 and a value of the register Rs2 in the register Rd.

The instruction "mov1 Rs, Rd" indicates the processing for writing a value of the register Rs into the register Rd. The instruction "mov2 Imm, Rd" indicates the processing for writing a value in the 1 mm field into the register Rd.

The instruction "div Rs, rd2 indicates the processing for writing a quotient obtained by dividing a value of the register Rs by a value of the register Rd into the register Rd. The instruction "mod Rs, Rd" indicates the processing for writing a remainder obtained by dividing a value of the register Rs by a value of the register Rd into the register Rd.

(Compiler)

Next, an example of the compiler in the present embodiment targeted for the above processor 30 will be explained referring to FIG. 12~FIG. 38.

(Overall Structure of Compiler)

Figure 12:
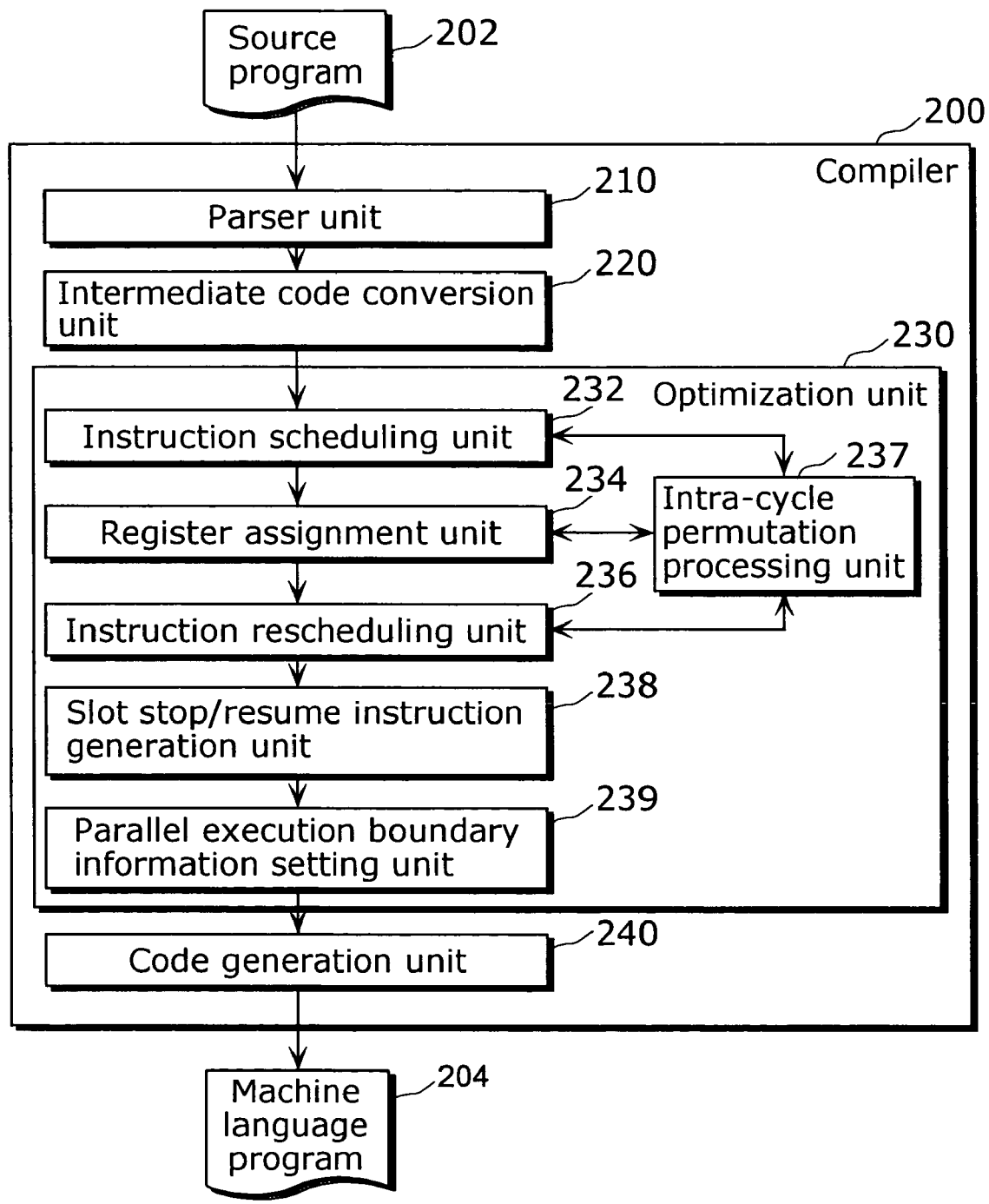
FIG. 12 is a functional block diagram showing a structure of a compiler according to the present embodiment.

FIG. 12 is a functional block diagram showing a structure of a compiler 200 in the present embodiment. This compiler 200 is a cross compiler that translates a source program 202 described in a high-level language such as C/C++ language into a machine language program 204 whose target processor is the above-mentioned processor 30. The compiler 200 is realized by a program executed on a computer such as a personal computer, and is roughly made up of a parser unit 210, an intermediate code conversion unit 220, an optimization unit 230 and a code generation unit 240.

The parser unit 210 is a preprocessing unit that extracts a reserved word (a keyword) and the like to carry out lexical analysis of the source program 202 (that contains the header file to be included) that is a target of the compilation, having an analysis function of an ordinary compiler.

The intermediate code conversion unit 220 is a processing unit which is connected to the parser unit 210 and converts each statement in the source program 202 passed from the parser unit 210 into intermediate codes according to certain rules. Here, an intermediate code is typically a code represented in a format of function invocation (a code indicating "+(int a, int b)"; indicating "add an integer a to an integer b", for example).

The optimization unit 230 includes: an instruction scheduling unit 232 which is connected to the intermediate code conversion unit 220 and, with focusing attention on operation codes of instructions included in the intermediate codes outputted from the intermediate code conversion unit 220, places the instructions so as to reduce power consumption of the processor 30 without changing dependency between the instructions; and a register assignment unit 234 which is connected to the instruction scheduling unit 232 and, with focusing attention on the register fields of the instructions included in the results of scheduling performed by the instruction scheduling unit 232, assigns registers so as to reduce power consumption of the processor 30.

The optimization unit 230 further includes: an instruction rescheduling unit 236 which is connected to the register assignment unit 234 and, with focusing attention on the bit patterns of the instructions included in the results of scheduling in which the registers are assigned, permutes the instructions so as to reduce power consumption of the processor 30 without changing dependency between the instructions; and a slot stop/resume instruction generation unit 238 which is connected to the instruction rescheduling unit 236, and detects a slot that stops for an interval of certain cycles or more based on the scheduling result in the instruction rescheduling unit 236 and inserts instructions to stop and resume the slot before and after the interval.

The optimization unit 230 further includes: a parallel execution boundary information setting unit 239 which is connected to the slot stop/resume instruction generation unit 238 and sets, based on the scheduling result, parallel execution boundary information on the placed instructions; and an intra-cycle permutation processing unit 237 which is connected to the instruction scheduling unit 232, the register assignment unit 234 and the instruction rescheduling unit 236 and permutes the instructions in the scheduling result per cycle so as to reduce power consumption.

It should be noted that the processing in the optimization unit 230 to be described later is executed in the unit of each basic block. A basic block is the unit of a program, such as a sequence of equations and assignment statements, in which there occurs no branch to outside in the middle thereof nor branch to the middle thereof from outside.

A code generation unit 240 is connected to the parallel execution boundary information setting unit 239 in the optimization unit 230, and permutes all the intermediate codes outputted from the parallel execution boundary information setting unit 239 into machine language instructions with reference to a conversion table or the like held in the code generation unit 240 itself so as to generate a machine language program 204.

Next, characteristic operations of the compiler 200 structured as mentioned above will be explained using specific examples.

(Instruction Scheduling Unit)

Figure 13:
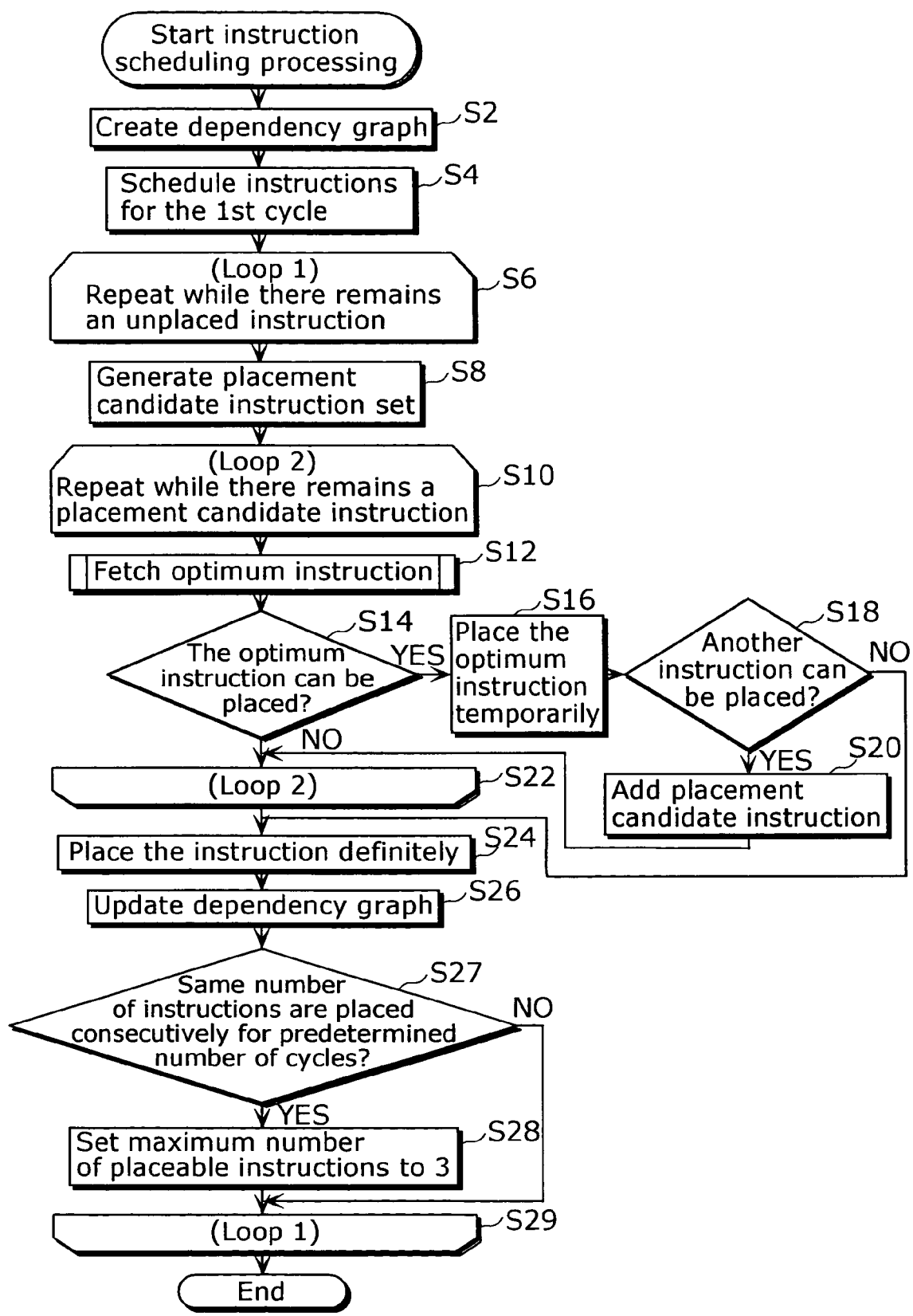
FIG. 13 is a flowchart showing operations of an instruction scheduling unit.

FIG. 13 is a flowchart showing the operation of the instruction scheduling unit 232. The instruction scheduling unit 232 does not perform scheduling of registers, but executes the processing on assumption that there are an infinite number of registers. Therefore, it is supposed in the following description that "Vr" (Virtual Register), such as "Vr 0" and "Vr1", is attached to the heads of the registers to be scheduled by the instruction scheduling unit 232.

Figure 14A:
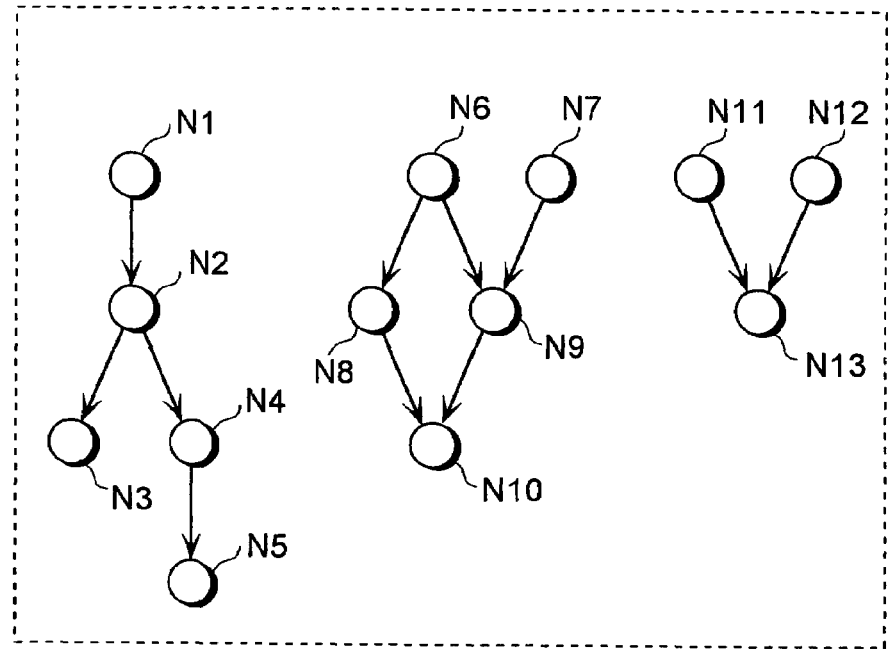
FIG. 14A and FIG. 14B are diagrams showing an example of a dependency graph.

The instruction scheduling unit 232 creates an instruction dependency graph based on the intermediate codes generated in the intermediate code conversion unit 220 (Step S2) ("Step" is omitted hereinafter). A dependency graph is a graph indicating dependency between instructions, namely, a directed graph in which a node is assigned to each instruction and instructions that are dependent on each other are connected by an edge. A dependency graph is a well-known technique, so the detailed explanation thereof is not repeated here. For example, a dependency graph consisting of three directed graphs as shown in FIG. 14A is created here.

Figure 14B:
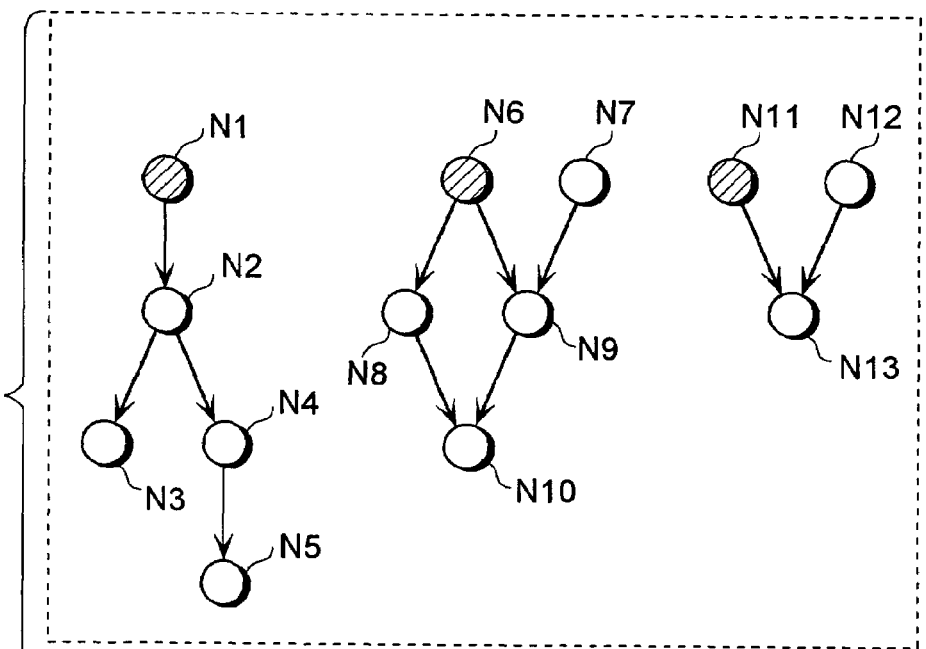

The instruction scheduling unit 232 selects executable instructions (nodes) in the dependency graph, and schedules the instructions for the first cycle so as to match a default logic of each slot (S4). For example, in the dependency graph of FIG. 14A, it is assumed that the instructions corresponding to the nodes N1, N6, N7, N11 and N12 can be scheduled, and among them, the node N1 corresponds to an instruction about memory access, the node N11 corresponds to a multiplication instruction, and the node N6 corresponds to a shift instruction. In this case, the nodes N1, N and N6 are placed in the first~the third slots for the first cycle respectively. Flags are attached to the placed nodes, and thus the dependency graph is updated as shown in FIG. 14B. After the instruction scheduling for the first cycle (S4), the result of instruction scheduling is obtained as shown in FIG. 15.

The instruction scheduling unit 232 generates placement candidate instruction set with reference to the dependency graph (S8). In the example of FIG. 14B, the instructions corresponding to the nodes N2, N7, N8 and N12 are the placement candidate instruction set.

The instruction scheduling unit 232 fetches one optimum instruction according to an algorithm to be described later from among the placement candidate instruction set (S12).

The instruction scheduling unit 232 judges whether the fetched optimum instruction can be actually placed or not (S14). Whether it can be placed or not is judged based on whether the number of instructions including the optimum instruction placed for the target cycle is not more than the number of instructions placed for the preceding cycle. As a result, the same number of instructions are placed consecutively for the following cycles.

When judging that the optimum instruction can be placed (YES in S14), the instruction scheduling unit 232 places it temporarily and deletes it from the placement candidate instruction set (S16). Then, the instruction scheduling unit 232 judges whether another instruction can be placed in the slot or not (S18) in the same manner as the above judgment (S14). When it judges that another instruction can be placed (YES in S18), it adds a new placement candidate instruction, if any, to the placement candidate instruction set with reference to the dependency graph (S20). The above processing for temporarily placing the instruction for a target cycle is repeated until all the placement candidate instructions are placed (S10~S22).

When it is judged that no more instruction can be placed for the target cycle (NO in S18) after the processing for temporary placement of the optimum instruction (S16), the processing executed by the instruction scheduling unit 232 exits from the loop of the temporary instruction placement processing (S10~S22).

After executing the temporary instruction placement processing (S10~S22), the instruction scheduling unit 232 definitely places the temporarily placed instruction and ends the scheduling of the placement candidate instruction set (S24). Then, flags indicating "placed" are attached to the nodes corresponding to the placed instructions in the dependency graph to update the dependency graph (S26).

The instruction scheduling unit 232 judges whether or not the same number of instructions are placed consecutively for a predetermined number of cycles (S27). When judging that the same number of instructions are placed consecutively for the predetermined number of cycles (when two instructions are placed consecutively for 20 cycles or more, or when one instruction is placed consecutively for 10 cycles or more, for example) (YES in S27), the instruction scheduling unit 232 sets the maximum number of instructions which can be placed for one cycle (hereinafter referred to "the maximum number of placeable instructions") to "3" (S28) so that three instructions are placed for one cycle in the following cycles as much as possible. The above-mentioned processing is repeated until all the instructions are placed (S6~S29).

FIG. 16 is a flowchart showing the operation of the optimum instruction fetching processing (S12) in FIG. 13.

The instruction scheduling unit 232 calculates a hamming distance between bit patterns of operation codes of each of the placement candidate instructions and each of the instructions which have been placed for the cycle preceding to the target cycle (S42).

For example, in FIG. 14B, the instructions corresponding to the nodes N2, N7, N8 and N12 can be placed at the start of scheduling for the second cycle. The instructions corresponding to the nodes N1, N6 and N11 have been placed for the first cycle. Therefore, the instruction scheduling unit 232 calculates the hamming distances between the bit patterns of the operation codes for all the combinations of the instructions corresponding to the nodes N1, N6 and N11 and the instructions corresponding to the nodes N2, N7, N8 and N12.

FIG. 17A and FIG. 17B are diagrams for explaining how to calculate hamming distances between bit patterns of operation codes. It is assumed that the instruction "ld Vr11, Vr12" has been already placed for the Nth cycle and placement candidate instructions for the (N+1)th cycle are "st Vr13, Vr14" and "add1 Vr13, Vr14". If the operation codes "ld" and "st" are compared referring to FIG. 17A, the bit patterns of the 12th, 16th, 17th, 24th and 25th bits are different from each other. Therefore, the hamming distance is 5. If the operation codes "ld" and "add1" are compared referring to FIG. 17B in the same manner as FIG. 17A, the bit patterns of the 16th, 17th, 18th, 20th, 25th, 26th, 28th and 31st bits are different from each other. Therefore, the hamming distance is 8.

FIG. 18A and FIG. 18B are diagrams for explaining how to calculate hamming distances between bit patterns of operation codes with different bit lengths. It is assumed that the instruction "ld Vr11, Vr12" has been already placed for the Nth cycle and placement candidate instructions for the (N+1)th cycle are "mul2 Vr13, Vr14, Vr15" and "st Vr13, Vr14". If the bit lengths of the operation codes are different like the operation codes "ld" and "mul2" in FIG. 18A, the hamming distance between the bit patterns of an overlapped portion of the operation codes is calculated. Therefore, the hamming distance is calculated based on the values of the 16th~31st bits of the operation codes. The bit patterns of the 16th, 18th, 19th, 22nd, 23rd, 25th, 26th, 27th, 28th, 30th and 31st bits are different between the operation codes "ld" and "mul2". Therefore, the hamming distance is 11. The hamming distance for another placement candidate instruction "st Vr13, Vr14" is calculated based on the values of the 16th~the 31st bits of the operation codes in FIG. 18B, in order to ensure consistency with the example of FIG. 18A. The bit patterns of the 16th, 17th, 24th and 25th bits are different between the operation codes "ld" and "st". Therefore, the hamming distance is 4.

Back to FIG. 16, the instruction scheduling unit 232 specifies the placement candidate instruction having the minimum hamming distance (S43). The instruction "st Vr13, Vr14" is specified in the examples of FIG. 17A~FIG. 18B.

The instruction scheduling unit 232 judges whether or not there are two or more placement candidate instructions having the minimum hamming distance (S44). When there is one placement candidate instruction having the minimum hamming distance (NO in S44), that instruction is specified as an optimum instruction (S56).

When there are two or more placement candidate instructions having the minimum hamming distance (YES in S44), the instruction scheduling unit 232 judges whether or not any of the placement candidate instructions match the default logic of a free slot in which no instruction is placed (S46).

If no placement candidate instruction matches the default logic (NO in S46), an arbitrary one of the two or more placement candidate instructions having the minimum hamming distance is selected as an optimum instruction (S54).

If any of the placement candidate instructions match the default logic and the number of such instructions is 1 (YES in S46 and NO in S48), that one placement candidate instruction is specified as an optimum instruction (S52).

If any of the placement candidate instructions match the default logic and the number of such instructions is 2 or more (YES in S46 and YES in S48), an arbitrary one of the two or more placement candidate instructions that match the default logic is selected as an optimum instruction (S50).

(Intra-Cycle Permutation Processing Unit)

Figure 19:
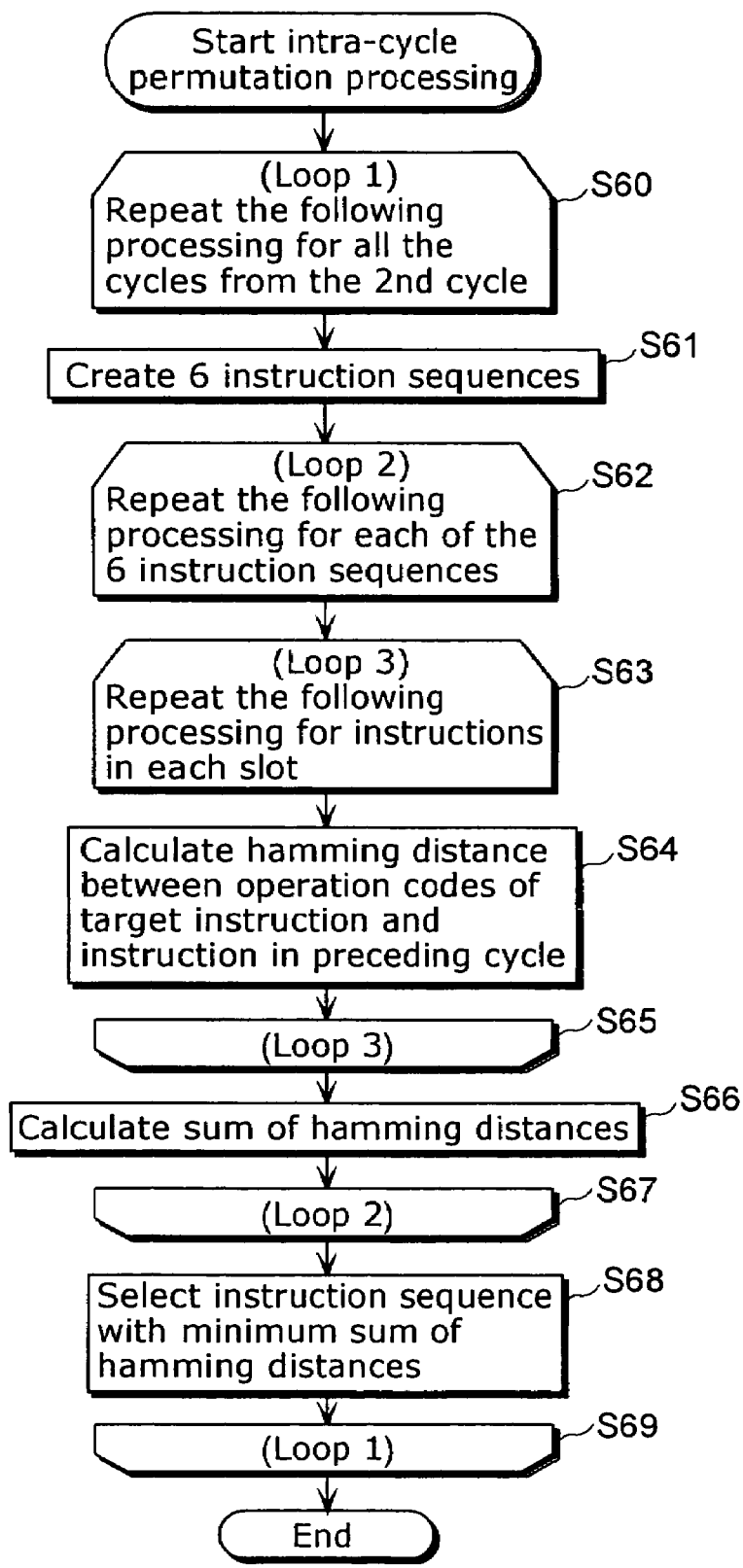
FIG. 19 is a flowchart showing operations of an intra-cycle permutation processing unit.

FIG. 19 is a flowchart showing the operation of the intra-cycle permutation processing unit 237. The intra-cycle permutation processing unit 237 adjusts the placement of instructions for each cycle based on the scheduling result in the instruction scheduling unit 232.

The intra-cycle permutation processing unit 237 permutes three instructions for the target cycle out of the second through the last cycles in the scheduling result so as to create six patterns of instruction sequences (S61). FIG. 20A~FIG. 20F are diagrams showing an example of 6 patterns of instruction sequences created as mentioned above.

The intra-cycle permutation processing unit 237 executes the processing for calculating the sum of the hamming distances for each of the 6 patterns of instruction sequences to be described later (S62~S67). The intra-cycle permutation processing unit 237 selects the instruction sequence with the minimum sum of the hamming distances from among the sums of the hamming distances calculated for the six patterns of the instruction sequences, and permutes the instructions so as to be the same placement as the selected instruction sequence (S68). The above-mentioned processing is repeated for the second through the last cycles (S60~S69).

Next, the processing for calculating the sum of the hamming distances for each of the six patterns of instruction sequences (S62~S567) will be explained. For each slot for each instruction sequence, the intra-cycle permutation processing unit 237 calculates a hamming distance between bit patterns of operation codes of instructions for a target cycle and instructions for the preceding cycle (S64). The intra-cycle permutation processing unit 237 executes the processing for calculating the hamming distances (S64) for all the instructions in the three slots (S63~S65), and calculates the sum of the hamming distances between the instructions in these three slots (S66). The above-mentioned processing is executed for all six patterns of instruction sequences (S62~S67).

FIG. 21 is a diagram showing an example of placed instructions. It is assumed that the instructions "Id Vr10, Vr11", "sub1 Vr12, Vr13" and "add1 Vr14, Vr15" are respectively placed for the Nth cycle as the instructions which are to be executed in the first, the second and the third slots. It is also assumed that the instructions "st Vr16, Vr17", "mul Vr18, Vr19" and "mod Vr20, Vr21" are respectively placed for the (N+1) cycle as the instructions which are to be executed in the first, the second and the third slots.

FIG. 22A~FIG. 22F are diagrams for explaining the instruction sequence creation processing (S61). For example, six instruction sequences as shown in FIG. 22A~FIG. 22F are created using the three instructions placed for the (N+1) cycle as shown in FIG. 21.

FIG. 23 is a diagram for explaining the processing for calculating hamming distances between operation codes (S64). For example, when calculating hamming distances for respective slots between operation codes of an instruction sequence for the Nth cycle in FIG. 21 and an instruction sequence for the (N+1)th cycle in FIG. 22C, the hamming distances in the first, the second and the third slots are 10, 9 and 5, respectively.

Therefore, the sum of the hamming distances is 24 in the example of FIG. 23. In the processing for calculating a sum of hamming distances (S66), the sums of the hamming distances between the instruction sequence for the Nth cycle as shown in FIG. 21 and the instruction sequences for the (N+1)th cycle as shown in FIG. 22A~FIG. 22F are calculated in the manner as mentioned above, and the values are 14, 16, 24, 22, 24 and 20, respectively. In the processing for selecting an instruction sequence (S68), the instruction sequence as shown in FIG. 22A having the minimum sum of hamming distances are selected from among six patterns of instruction sequences.

(Register Assignment Unit)

Figure 24:
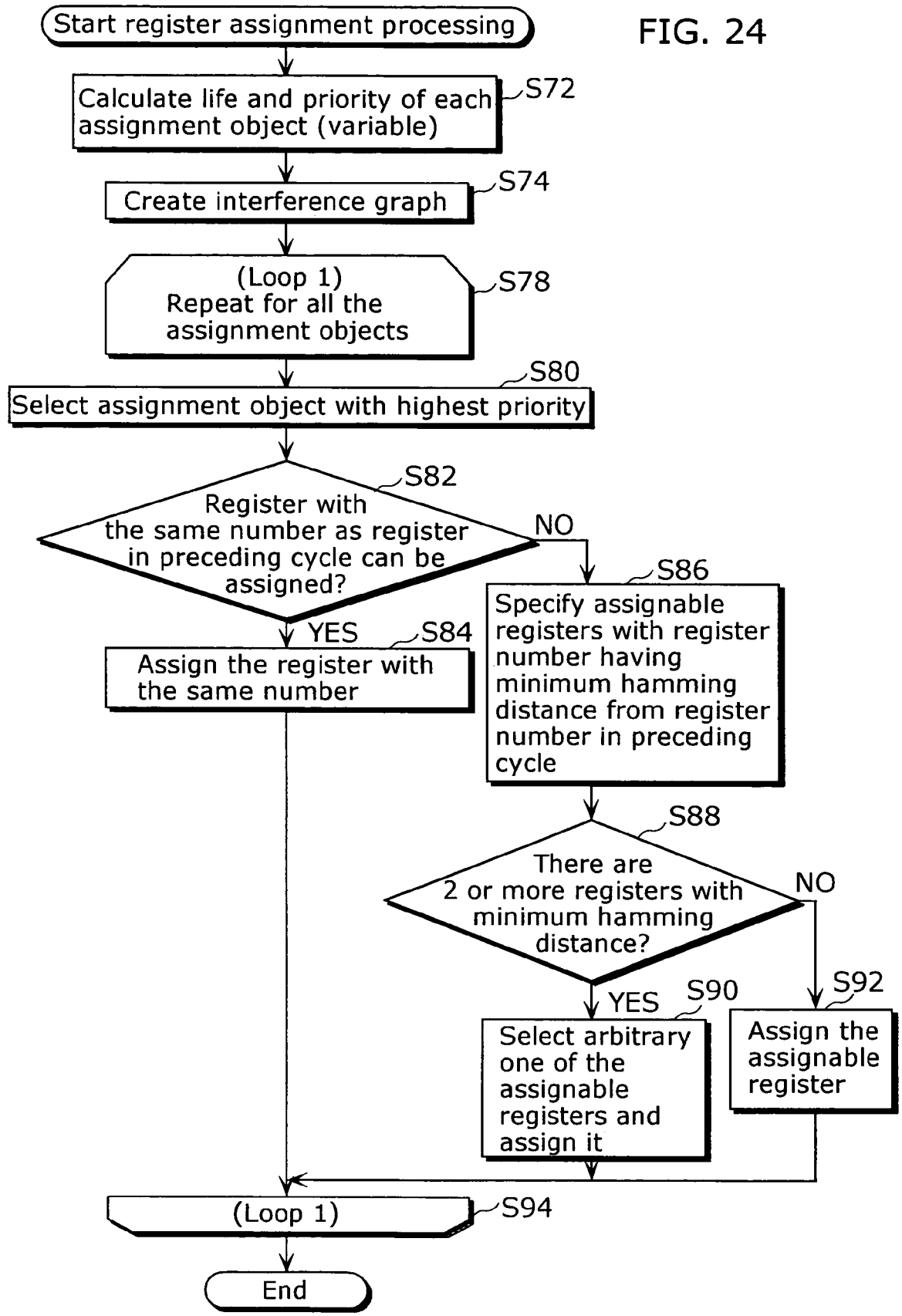
FIG. 24 is a flowchart showing operations of a register assignment unit.

FIG. 24 is a flowchart showing the operation of the register assignment unit 234. The register assignment unit 234 actually assigns registers based on the scheduling result in the instruction scheduling unit 232 and the intra-cycle permutation processing unit 237.

The register assignment unit 234 extracts assignment objects (variables) from the source program 202 and calculates a life and a priority of each assignment object (S72). A life is a time period from definition of a variable in a program to end of reference to the variable. Therefore, one variable may have a plurality of lives. Priority is determined based on a life length of an assignment object and frequency of reference to the object. The detailed explanation thereof is not repeated because it is not an essential part of the present invention.

The register assignment unit 234 creates an interference graph based on the assignment objects (S74). An interference graph is a graph indicating conditions of assignment objects under which the same register cannot be assigned. Next, how to create an interference graph will be explained.

Figure 25:
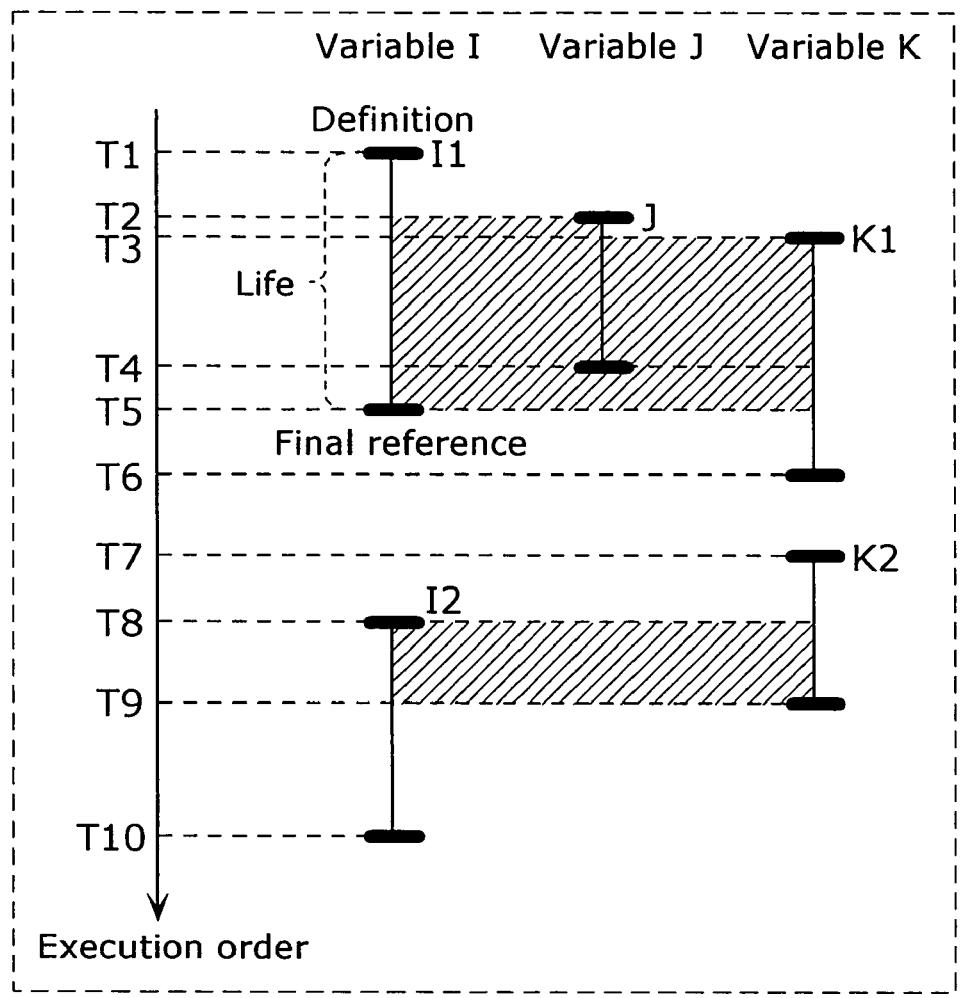
FIG. 25 is a diagram showing variables as assignment objects.

FIG. 25 is a diagram showing lives of variables that are assignment objects. In this example, three variables I, I and K are assignment objects.

A variable I is defined in Step T1 and finally referred to in Step T5. The variable I is again defined in Step T8 and finally referred to in Step T10. Therefore, the variable I has two lives. The variable I in the former life is defined as a variable I1 and that in the latter life is defined as a variable I2. A variable J is defined in Step T2 and finally referred to in Step T4.

A variable K is defined in Step T3 and finally referred to in Step T6. The variable K is again defined in Step T7 and finally referred to in Step T9. Therefore, the variable K has two lives like the variable I. The variable K in the former life is defined as a variable K1 and that in the latter life is defined as a variable K2.

The variables I1, I2, J, K1 and K2 have the following overlaps of their lives. The lives of the variables I1 and J overlap in Steps T2~T4. The lives of the variables J and K1 overlap in Steps T3~T4. The lives of the variables I1 and K1 overlap in Steps T3~T5. The lives of the variables I2 and K2 overlap in Steps T8~T9. If the lives of variables overlap, they cannot be assigned to the same register. Therefore, in an interference graph, variables that are assignment objects are nodes and the variables whose lives overlap are connected by edges.

Figure 26:
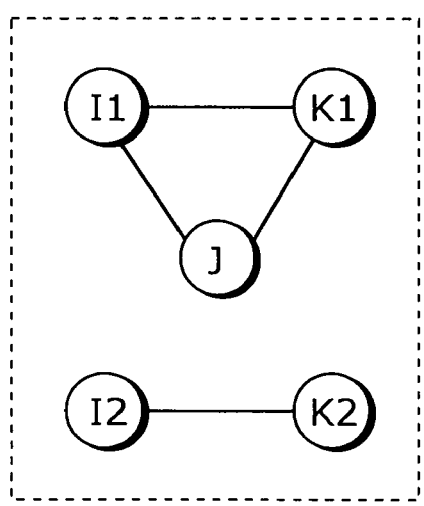
FIG. 26 is a diagram showing an interference graph of variables created based on the example of FIG. 25.
Figure 27:
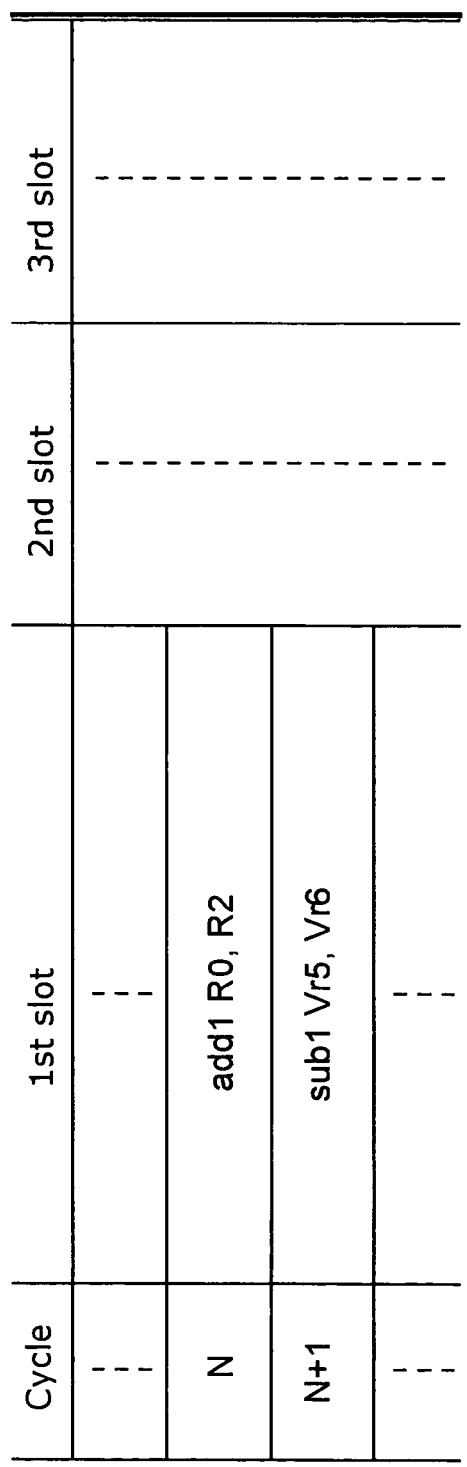
FIG. 27A~FIG. 27C are diagrams showing results obtained in the processing of instruction scheduling.

FIG. 26 is a diagram showing an interference graph of variables created based on the example of FIG. 25. Nodes I1, K1 and J are connected to each other by edges. There are overlaps in the lives of the variables I1, K1 and J, and thus it is found that the same register cannot be assigned to these three variables. Nodes I2 and K2 are connected by an edge in the same manner. Therefore, it is found that the same register cannot be assigned to the variables I2 and K2.

However, there exists no dependency between nodes which are not connected by an edge. For example, nodes J and K2 are not connected by an edge. Therefore, there is no overlap between the variables I and K2, and thus it is found that the same register can be assigned to them.

Back to FIG. 24, the register assignment unit 234 selects the assignment object with the highest priority among the assignment objects to which registers are not assigned (S80). The instruction scheduling unit 232 judges whether or not a register, with a number same as the register number in the same field of an instruction which is to be executed in the same slot just before the instruction referring to the assignment object, can be assigned to the assignment object (S82). This judgment is made with reference to the above-mentioned interference graph.

FIG. 27A~FIG. 27C are diagrams showing results obtained in the instruction scheduling processing. For example, it is assumed, referring to FIG. 27A, that a current assignment object is assigned to a source operand (register Vr5) in the first slot for the (N+1)th cycle. The register Vr5 is temporarily set, as mentioned above. Therefore, in the processing for judging register allocability (S82), it is judged whether an assignment object can be assigned to a register used in the same field for the Nth cycle (register R0 in this case). FIG. 27B shows bit patterns of instructions in a case where the register R0 is assigned to Vr5. This shows that power consumption can be reduced because of register characteristics by accessing the same register in the consecutive cycles.

When it is judged that the register with the same number can be assigned (YES in S82), the register assignment unit 234 assigns the above register with the same number to the assignment object (S84). When it is judged that the register with the same number cannot be assigned (NO in S82), the register assignment unit 234 specifies the registers with the register number having the minimum hamming distance from the register number in the same field in the same slot in the preceding cycle, from among the register numbers (binary representation) of the allocable registers (S86). FIG. 27C shows an example where the register R1 with the register number (00001) having the minimum hamming distance from the register number (00000) of the register R0 is selected from among the allocable registers.

Where there is only one allocable register having the minimum hamming distance (NO in S88), that register is assigned to the assignment object (S92). When there are two or more allocable registers having the minimum hamming distance (YES in S88), arbitrary one of the two or more allocable registers is selected and assigned to the assignment object (S90). The above processing is repeated until there is no more assignment object (S78~S94).

After the processing in the register assignment unit 234, the intra-cycle permutation processing unit 237 adjusts placement of instructions in each cycle based on the scheduling result by the register assignment unit 234. The processing executed in the intra-cycle permutation processing unit 237 is same as the processing which has been explained referring to FIG. 19 and FIG. 20A~FIG. 20F. Therefore, the detailed explanation thereof is not repeated here.

(Instruction Rescheduling Unit)

Figure 28:
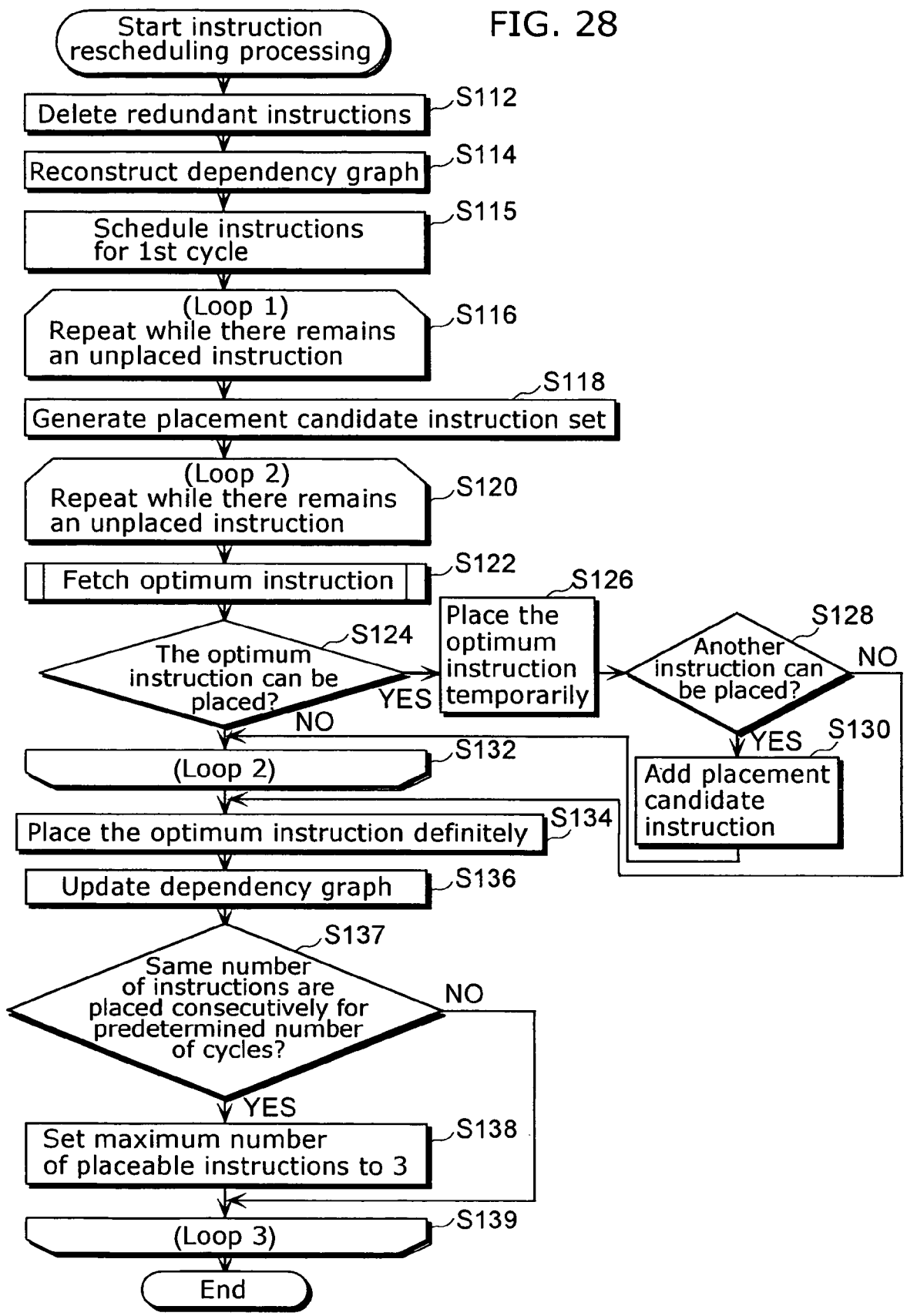
FIG. 28 is a flowchart showing operations of an instruction rescheduling unit.

FIG. 28 is a flowchart showing the operation of the instruction rescheduling unit 236. The instruction rescheduling unit 236 executes the processing for rescheduling the placement result of the instructions which have been scheduled so as to be operable in the processor 30 according to the processing executed by the instruction scheduling unit 232, the register assignment unit 234 and the intra-cycle permutation processing unit 237. In other words, the instruction rescheduling unit 236 reschedules the instruction sequences to which registers have been definitely assigned by the register assignment unit 234.

The instruction rescheduling unit 236 deletes redundant instructions from the scheduling result. For example, an instruction "mov1 R0, R0" is a redundant instruction because it is an instruction for writing the contents of the register R0 into the register R0. When an instruction in the first slot in the same cycle is "mov2 4, R1" and an instruction in the second slot in the same cycle is "mov2 5, R1", they are instructions for writing 4 and 5 into the register R1, respectively. In the present embodiment, an instruction in a slot of a larger number shall be executed with the higher priority. Therefore, the instruction "mov2 4 R1" in the first slot is a redundant instruction.

If a redundant instruction is deleted, dependency between instructions could be changed. Therefore, the instruction rescheduling unit 236 reconstructs a dependency graph (S114). The instruction rescheduling unit 236 selects executable instructions (nodes) in the dependency graph, and schedules them for the first cycle so as to match a default logic in each slot (S115). Flags indicating "placed" are attached to the nodes corresponding to the instructions for the first cycle in the dependency graph.

The instruction rescheduling unit 236 generates a placement candidate instruction set with reference to the dependency graph (S118). The instruction rescheduling unit 236 fetches one optimum instruction from among the placement candidate instruction set according to an algorithm to be described later (S122).

The instruction rescheduling unit 236 judges whether the fetched optimum instruction can actually be placed or not (S124). This judgment is same as the judgment in S14 of FIG. 13. Therefore, the detailed explanation thereof is not repeated here.

When the instruction rescheduling unit 236 judges that the optimum instruction can be placed (YES in S124), it places the instruction temporarily and deletes it from the placement candidate instruction set (S126). Then, the instruction rescheduling unit 236 judges whether another instruction can be placed or not (S128) in the same manner of the above judgment of placement (S124). When it judges that another instruction can be placed (YES in S128), it refers to the dependency graph to see whether there is a new placement candidate instruction or not, and adds it to the placement candidate instruction set, if any (S130). The above-mentioned processing is repeated until there is no more placement candidate instruction (S120~S132).

It should be noted that when it is judged that no more instruction can be placed for the target cycle (NO in S128) after the processing for placing the optimum instruction temporarily (S126), the processing of the instruction rescheduling unit 236 exits from the loop of the processing for placing the optimum instruction temporarily (S120~S132).

After the processing for placing the optimum instruction temporarily (S120~S132), the instruction rescheduling unit 236 definitely places the temporarily placed instruction, and ends the scheduling of the placement candidate instruction set (S134). Then, flags indicating "placed" are attached to the nodes corresponding to the placed instructions in the dependency graph so as to update the dependency graph (S136).

The instruction rescheduling unit 236 judges whether or not the same number of instructions are placed consecutively for predetermined cycles (S137). When judging that the same number of instructions are placed consecutively for the predetermined number of cycles (YES in S137), the instruction rescheduling unit 236 sets the maximum number of placeable instructions to 3 (S138) so that three instructions are placed for one cycle as much as possible. The above-mentioned processing is repeated until there are no more unplaced instructions remaining (S116~S139).

FIG. 29 is a flowchart showing the operation of the optimum instruction fetching processing (S122) in FIG. 28. Comparing the instruction for the target cycle with the instruction executed in the same slot for the preceding cycle among the placement candidate instructions, the instruction rescheduling unit 236 obtains the number of fields having the same register numbers and specifies a placement candidate instruction having the maximum number of the fields having the same register numbers (S152).

FIG. 30A and FIG. 30B are diagrams for explaining the processing for specifying placement candidate instructions (S152). It is assumed that an instruction "add1 R0, R2" is placed as an instruction to be executed in the first slot for the Nth cycle and there are instructions which can be placed in the first slot for the (N+1)th cycle, "sub1 R0, R1" as shown in FIG. 30A and "div R0, R2" as shown in FIG. 30B. When the instruction "sub1 R0, R1" is placed in the placement position as shown in FIG. 30A, the field having the same register number is only the field in which the register R0 (with the register number 00000) is placed. Therefore, the number of fields having the same register number is 1. When the instruction "div R0, R2" is placed in the placement position as shown in FIG. 30B, two fields in which the register R0 (with the register number 00000) and the register R2 (with the register number 00010) are placed respectively have the same register numbers. Therefore, the number of fields having the same register numbers is 2.

When there is only one placement candidate instruction having the maximum number of such fields (NO in S154), that placement candidate instruction is specified as an optimum instruction (S174).

When there is no placement candidate instruction having the maximum number of such fields or there are two or more such instructions (YES in S154), the instruction rescheduling unit 236 compares an instruction to be executed in the same slot for the preceding cycle with each of the placement candidate instructions so as to obtain the instructions having the minimum hamming distance between the bit patterns of both instructions (S156).

FIG. 31A and FIG. 31B are diagrams for explaining the processing for specifying the placement candidate instructions (S156). It is assumed that an instruction "mul1 R3, R10" is placed as an instruction to be executed in the first slot for the Nth cycle and there are instructions which can be placed in the first slot for the (N+1)th cycle, "add1 R2, R4" as shown in FIG. 31A and "sub2 R11, R0, R2" as shown in FIG. 31B. The bit patterns of these instructions are shown in these figures. When the instruction "add1 R2, R4" is placed in the placement position as shown in FIG. 31A, the hamming distance from the instruction "mul1 R3, R10" is 10. When the instruction "sub2 R11, R0, R2" is placed in the placement position as shown in FIG. 31B, the hamming distance from the instruction "mul1 R3, R10" is 8. Therefore, the instruction "sub2 R11, R0, R2" is specified as a placement candidate instruction.

When there is one placement candidate instruction having the minimum hamming distance (NO in S158), that placement candidate instruction is specified as an optimum instruction (S172).

When there are two or more placement candidate instructions having the minimum hamming distance (YES in S158), one of the two or more placement candidate instructions that matches the default logic of the slot in which that placement candidate instruction is executed (S160).

FIG. 32A and FIG. 32B are diagrams for explaining the processing for specifying placement candidate instructions (S160). It is assumed that an instruction "st R1, R13" is placed as an instruction to be executed in the first slot for the Nth cycle and there are instructions which can be placed in the first slot for the (N+1)th cycle, an instruction "ld R30, R18" as shown in FIG. 32A and an instruction "sub1 R8, R2" as shown in FIG. 32B. The bit patterns of these bit instructions are shown in these figures. The default logic of the first slot is an instruction about memory access, as mentioned above. This can be found from the first 2 bits "01" of the instruction. Since the first 2 bits of the instruction "ld R30, R18" is "01", it matches the default logic of the first slot, whereas, since the first 2 bits of the instruction "sub1 R8, R2" is "11", it does not match the default logic of the first slot. Therefore, the instruction "ld R30, R18" is specified as a placement candidate instruction.

When there is no placement candidate instruction that matches the default logic (NO in S162), an arbitrary one of the placement candidate instructions having the minimum hamming distance is selected as an optimum instruction (S170).

When there is a placement candidate instruction that matches the default logic and the number of such an instruction is 1 (YES in S162 and NO in S164), that placement candidate instruction that matches the default logic is specified as an optimum instruction (S168).

When there are placement candidate instructions that match the default logic and the number of such instructions is 2 or more (YES in S162 and YES in S164), an arbitrary one of such instructions that match the default logic is selected as an optimum instruction (S166).

After the processing in the instruction rescheduling unit 236, the intra-cycle permutation processing unit 237 adjusts placement of instructions in each cycle based on the scheduling result in the instruction rescheduling unit 236. The processing executed in the intra-cycle permutation processing unit 237 is the same as the processing which has been explained referring to FIG. 19 and FIG. 20~FIG. 20F. Therefore, the detailed explanation thereof is not repeated here.

That is the explanation of the operation of the instruction rescheduling unit 236. The number of slots used for one cycle may be limited according to an option of compilation or a pragma described in a source program. A "pragma" is a description giving a guideline for optimization of a compiler without changing the meaning of a program.

For example, as shown in the following first example, "-para" is set as an option of compilation of a source program described in C language and the number of slots is defined by the following number. In the first example, a source program "foo.c" is compiled by a C compiler, and two instructions are always placed for each cycle in the scheduling result.

Also, as shown in the second example, the number of slots used for each function described in a source program may be defined by a pragma. In the second example, the number of slots used for executing a function func is defined as 1. Therefore, only one instruction is always placed for each cycle executing the function func in the scheduling result.

FIRST EXAMPLE cc -para 2 foo.c

SECOND EXAMPLE pragma para=1 func int func (void) {
......
}

It should be noted that when both an option and a pragma are set at the same time, either one having a smaller specified value may be selected by priority. For example, when the function func as shown in the second example and its pragma are specified in the source program "foo.c" as shown in the first example, the processing in two slots are executed in parallel as a rule, but a schedule result is created so that the processing in only one slot is executed in the cycle for executing the function func.

In addition, an option and a pragma may be considered based on not only the operation of the instruction rescheduling unit 236 but also the operation of the instruction scheduling unit 232 or the register assignment unit 234.

(Slot Stop/Resume Instruction Generation Unit)

Figure 33:
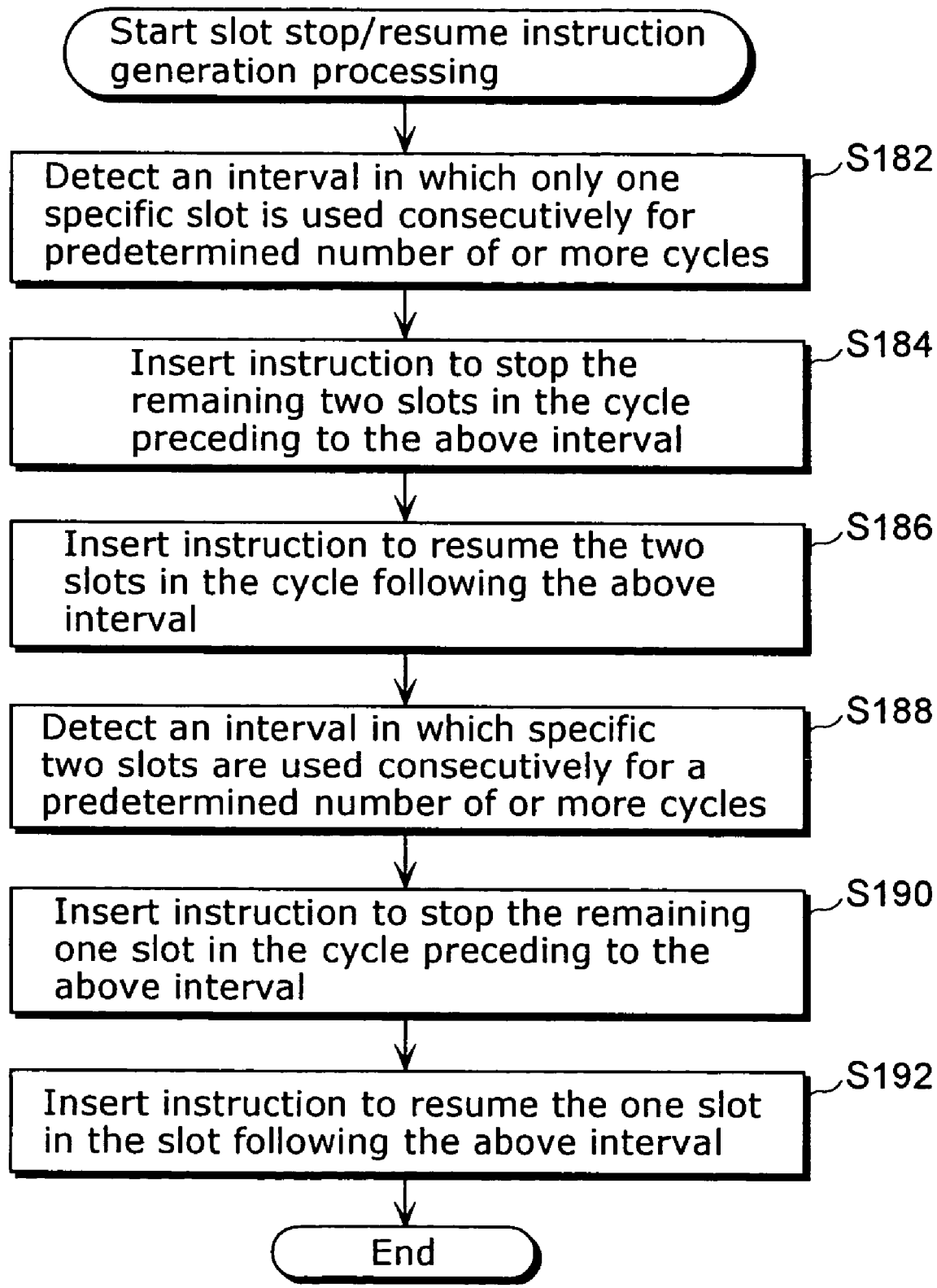
FIG. 33 is a flowchart showing operations of a slot stop/resume instruction generation unit.

FIG. 33 is a flowchart showing the operation of the slot stop/resume instruction generation unit 238. The slot stop/resume instruction generation unit 238 detects an interval in which only one specific slot is used consecutively for a predetermined number (4 cycles, for example) of cycles based on the scheduling result in the instruction rescheduling unit 236 (S182). The slot stop/resume instruction generation unit 238 inserts an instruction to stop the remaining two slots in a free slot position in the cycle that immediately precedes the above interval (S184). When there is no free slot position for inserting the instruction in the preceding cycle, one cycle is added for inserting the above instruction.

Next, the slot stop/resume instruction generation unit 238 inserts an instruction for resuming the two slots that have been stopped in a free slot position in the cycle that immediately follows the above interval (S186). When there is no free slot position for inserting the instruction in the following cycle, one cycle is added for inserting the above instruction.

Figure 34:
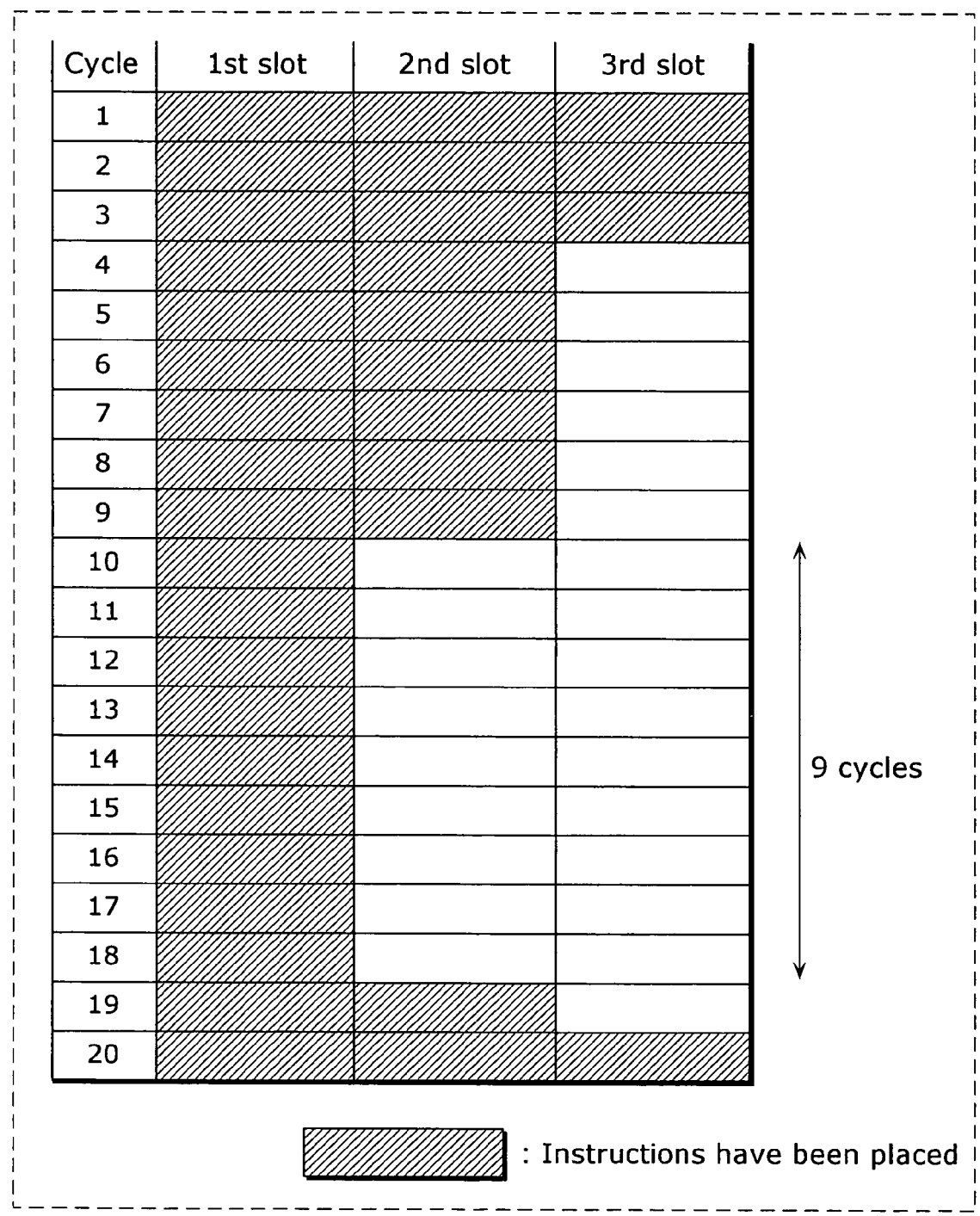
FIG. 34 is a diagram showing an example of a scheduling result in which instructions are placed.
Figure 35:
FIG. 35 is a diagram showing an example of a scheduling result in which instructions are written as processing for a case where specific one slot is only used consecutively.

FIG. 34 is a diagram showing an example of the scheduling result in which instructions are placed. In nine cycles from the 10th cycle through 18th cycle, only the first slot is used consecutively. Therefore, an instruction to operate only the first slot and stop the remaining two slots ("set1 1") is written in a free slot in the 9th cycle. And an instruction to resume the remaining two slots ("clearn1 1") is written in a free slot in the 19th cycle. FIG. 35 is a diagram showing an example of a scheduling result in which the above instructions are written based on the processing for a case where specific only one slot is used consecutively (S182~S186) in FIG. 33.

Back to FIG. 33, the slot stop/resume instruction generation unit 238 detects an interval in which specific two slots are only used consecutively for a predetermined number (4, for example) of or more cycles based on the scheduling result (S188). The slot stop/resume instruction generation unit 238 inserts an instruction to stop the remaining one slot in a free slot position in the cycle preceding to the above interval (S190). When there is no free slot position for inserting the instruction in the preceding cycle, one cycle is added for inserting the above instruction.

Next, the slot stop/resume instruction generation unit 238 inserts an instruction to resume the stopped one slot in a free slot position following the above interval (S192). When there is no free slot position for inserting the instruction in the following cycle, one cycle is added for inserting the above instruction.

Figure 36:
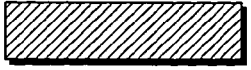
FIG. 36 is a diagram showing an example of a scheduling result in which instructions are written as processing for a case where specific two slots are only used consecutively.

In five cycles, from the 4th cycle through 8th cycle in the scheduling result in FIG. 35, only the first and the second slots are used but the third slot is not used. Therefore, there is a need to insert an instruction to stop the third slot ("set2 12") and an instruction to resume it ("clear2 12") in the preceding and following cycles respectively. However, instructions have been placed in all the slots in both the 3rd and the 9th cycles. Therefore, the slot stop/resume instruction generation unit 238 inserts new cycles before the 4th cycle and after the 8th cycle for writing the above two instructions. FIG. 36 is a diagram showing an example of a scheduling result in which the instructions are written based on the processing for a case where specific two slots are only used consecutively (S188-S192) in FIG. 33.

In the present embodiment, it is assumed that instructions are placed in the order of the first, second and third slots. Therefore, the third slot is not in operation when two slots are in operation, and the second and third slots are not in operation when only one slot is in operation.

Figure 37:
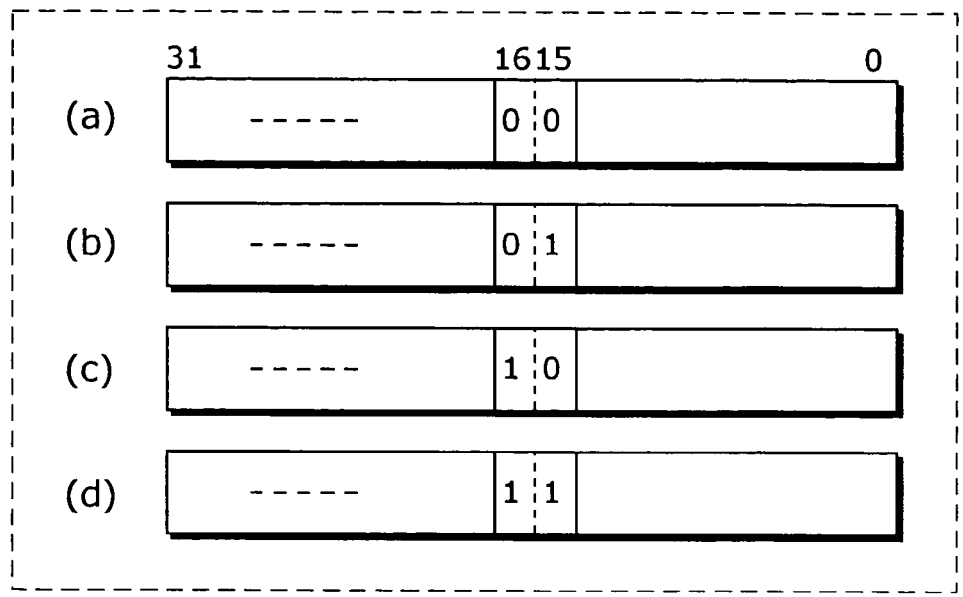
FIGS. 37 ((a)~(d)) are diagrams showing an example of a program status register.

A 32-bit program status register (not shown in the figures) is provided in the processor 30. FIG. 37 is a diagram showing an example of a program status register. For example, the number of slots which are in operation can be represented using 2 bits of the 15th and 16th bits. In this case, FIGS. 37 ((a)~(d)) indicate that the numbers of slots which are in operation are 0~3, respectively.

Figure 38:
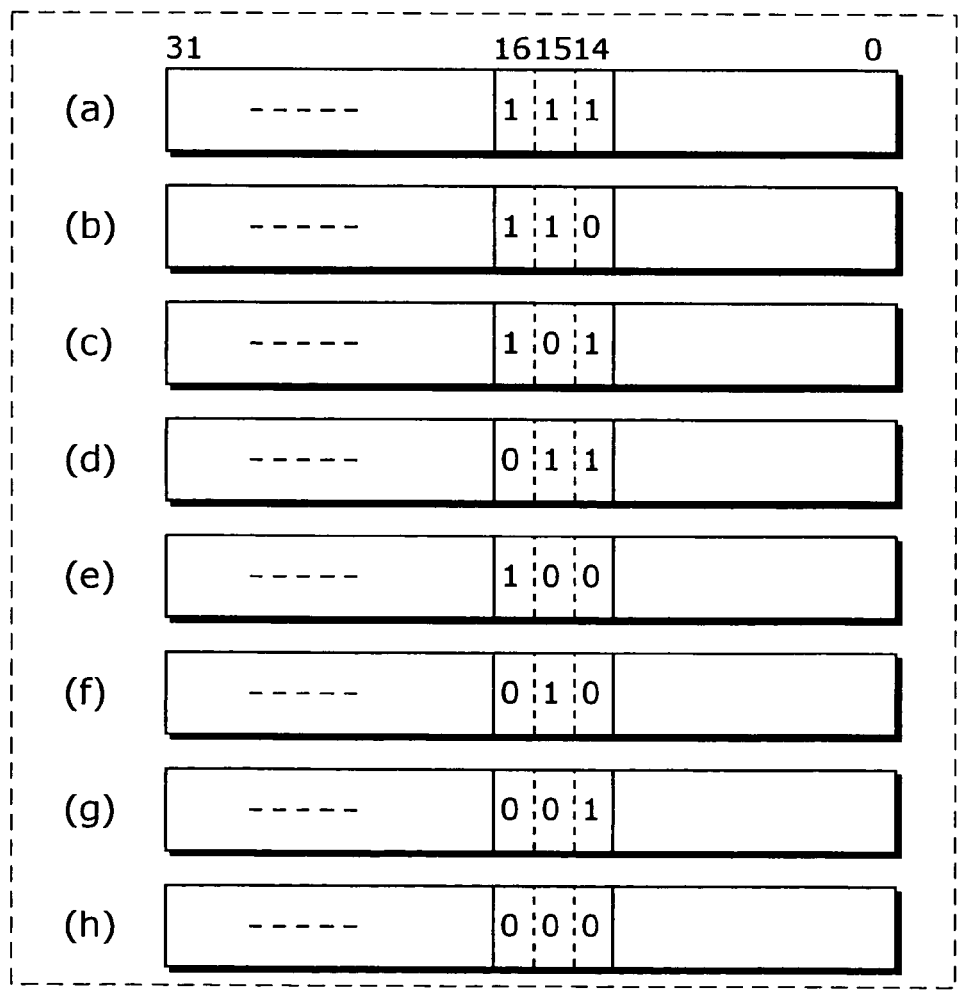
FIGS. 38 ((a)~(h)) are diagrams showing another example of a program status register.

FIG. 38 is a diagram showing another example of a program status register. In this program status register, the 14th, 15th and 16th bits correspond to the first, second and third slots, respectively. The value "1" of the bit indicates that the slot is in operation and the value "0" of the bit indicates that the slot is stopped. For example, the program status register as shown in FIG. 38 (*b*) shows that the first slot is stopped and the second and third slots are in operation.

The values held in the program status register are rewritten according to the instruction "set1" or "set2".

That is the explanation of the compiler in the present embodiment, but each unit in the compiler 200 can be modified as follows. Next, the modifications thereof will be explained one by one.

(Modifications of Each Unit in Compiler)

(Modification of Operation of Instruction Rescheduling Unit 236)

In the present embodiment, the operation of the instruction rescheduling unit 236 has been explained referring to FIG. 28 and FIG. 29. However, the processing for fetching an optimum instruction as shown in FIG. 39 may be executed instead of the processing for fetching an optimum instruction (S122) as explained referring to FIG. 29.

Figure 39:
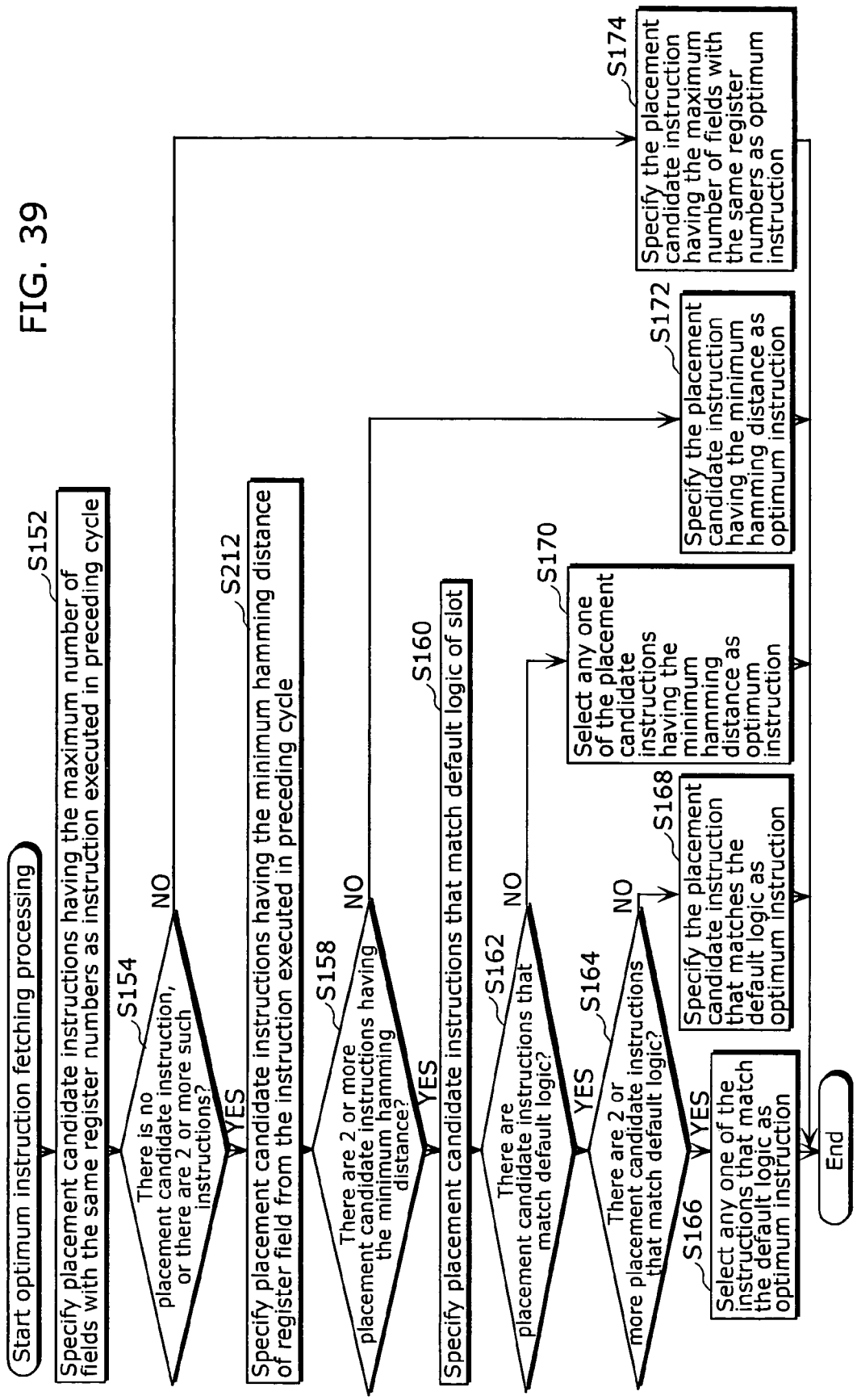
FIG. 39 is a flowchart showing other operations of the optimum instruction fetching processing as shown in FIG. 28.

FIG. 39 is a flowchart showing another operation of the processing for fetching an optimum instruction (S122) in FIG. 28.

The instruction rescheduling unit 236 calculates the minimum hamming distance by the following method instead of the processing for calculating the minimum hamming distance (S156) in FIG. 29. To be more specific, the instruction rescheduling unit 236 compares bit patterns in register fields between an instruction executed in the same slot in the preceding cycle and each of placement candidate instructions so as to obtain the instruction with the minimum hamming distance (S212).

FIG. 40A and FIG. 40B are diagrams for explaining the processing for specifying placement candidate instructions (S212). It is assumed that an instruction "add1 R0, R2" is placed as an instruction to be executed in the first slot in the Nth cycle and an instruction "sub1 R3, R1" as shown in FIG. 40A and an instruction "div R7, R1" as shown in FIG. 40B are placed as instructions which can be placed in the first slot in the (N+1)th cycle. The bit patterns of these instructions are shown in these figures. When the instruction "sub1 R3, R1" is placed in the above placement position as shown in FIG. 40A, the hamming distance between the register fields of this instruction and the instruction "add1 R0, R2" is 4. When the instruction "div R7, R1" is placed in the above placement position as shown in FIG. 40B, the hamming distance between the register fields of this instruction and the instruction "add1 R0, R2" is 5. Therefore, the instruction "add1 R0, R2" is specified as an placement candidate instruction.

Other processing (S152~S154 and S158~S174) is same as that as explained referring to FIG. 29. Therefore, the detailed explanation thereof is not repeated here.

(First Modification of Intra-cycle Permutation Processing Unit 237)

Figure 41:
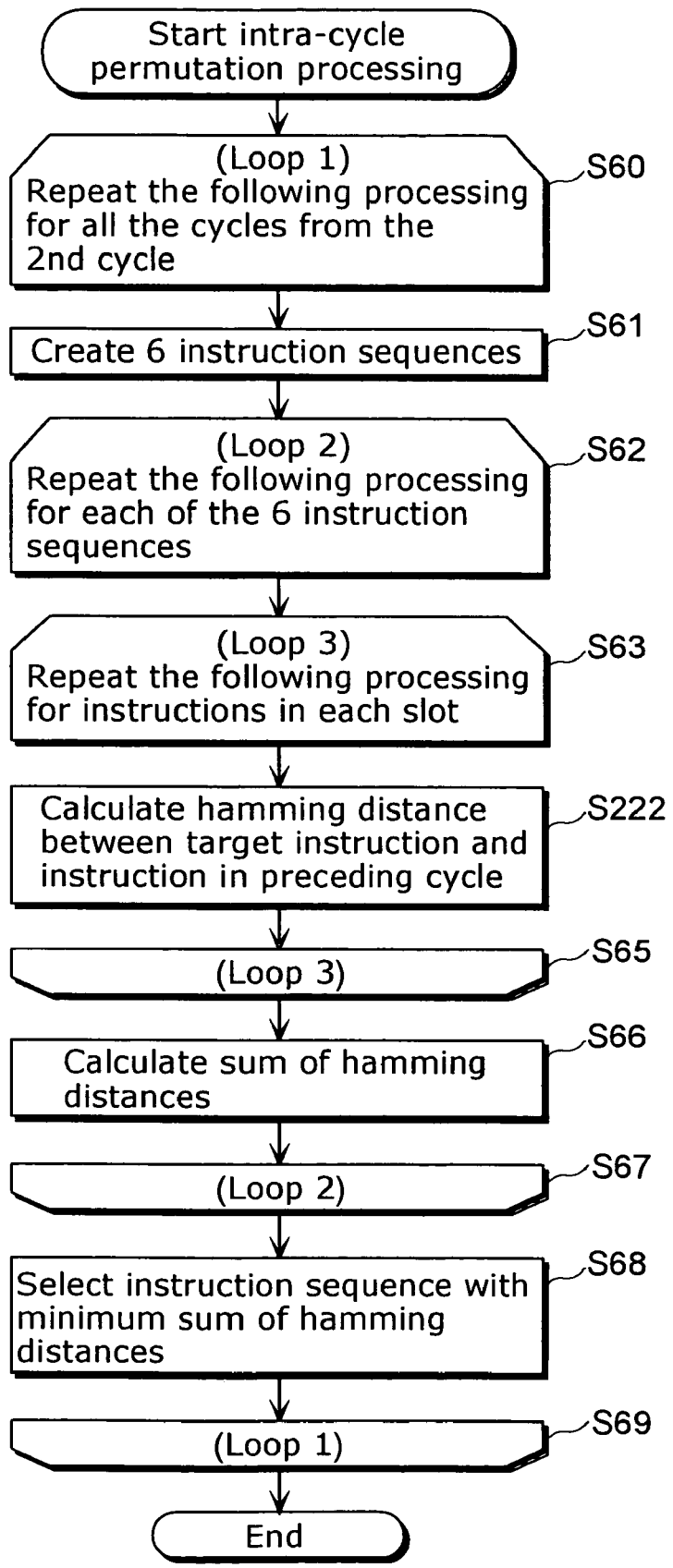
FIG. 41 is a flowchart showing the first modification of the operations of the intra-cycle permutation processing unit 237.

The intra-cycle permutation processing unit 237 may execute the processing as shown in FIG. 41 instead of the processing which has been explained referring to FIG. 19.

FIG. 41 is a flowchart showing the first modification of the operation of the intra-cycle permutation processing unit 237.

The intra-cycle permutation processing unit 237 calculates the minimum hamming distance by the following method instead of the processing for calculating the hamming distance (S64) as shown in FIG. 19. To be more specific, the intra-cycle permutation processing unit 237 calculates the hamming distance between bit patterns of a target instruction and an instruction in the preceding cycle for each slot in each instruction sequence (S222). The other processing (S60~S63 and S65~S69) is same as the processing which has been explained referring to FIG. 19. Therefore, the detailed explanation thereof is not repeated here.

FIG. 42 is a diagram for explaining processing for calculating a hamming distance between instructions (S222). For example, when the hamming distance between instructions in each slot in an instruction sequence in the Nth cycle as shown in FIG. 21 and an instruction sequence in the (N+1)th cycle as shown in FIG. 22C is calculated, the hamming distances in the first, second and third slots are 12, 11 and 11, respectively.

Consequently, the sum of the hamming distances is 34 in the example of FIG. 42. In the processing for calculating the sum of hamming distances (S66), the sums of the hamming distances between instructions in the instruction sequence in the Nth cycle as shown in FIG. 21 and 6 patterns of instruction sequences as shown in FIG. 22A~FIG. 22F are calculated in the above-mentioned manner, and the calculated sums are 28, 26, 34, 28, 34 and 30, respectively. In the processing for selecting an instruction sequence (S68), the instruction sequence as shown in FIG. 22B having the minimum sum of hamming distances is selected from among the six patterns of instruction sequences.

Note that it is assumed in the processing for calculating the hamming distance (S222) in the present modification that registers have been assigned. Therefore, the processing of the intra-cycle permutation processing unit 237 in the present modification cannot be executed after the processing in the instruction scheduling unit 232 in which registers have not yet been assigned, but executed after the processing in the register assignment unit 234 or the processing in the instruction rescheduling unit 236.

(Second Modification of Intra-cycle Permutation Processing Unit 237)

Figure 43:
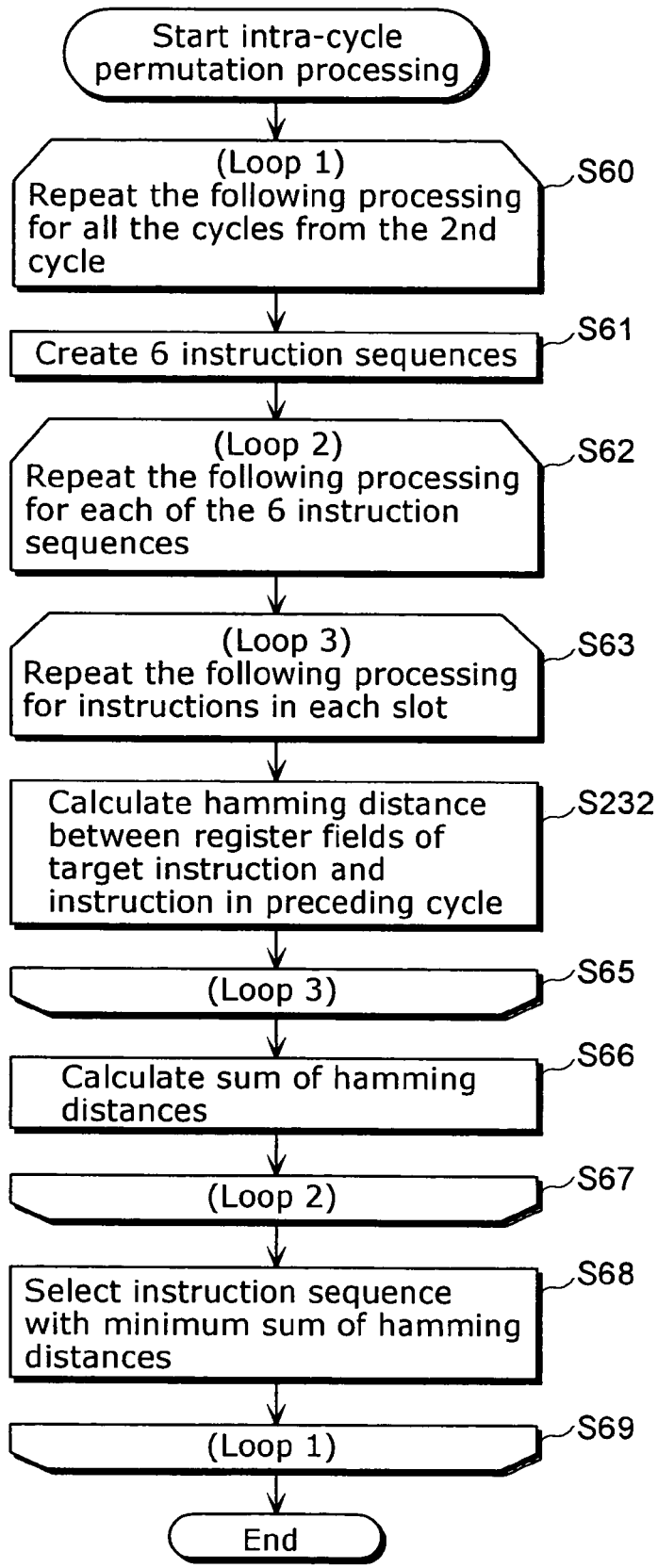
FIG. 43 is a flowchart showing the second modification of the operations of the intra-cycle permutation processing unit 237.

The intra-cycle permutation processing unit 237 may execute the processing as shown in FIG. 43 instead of the processing which has been explained referring to FIG. 19.

FIG. 43 is a flowchart showing the second modification of the operation of the intra-cycle permutation processing unit 237.

The intra-cycle permutation processing unit 237 calculates the minimum hamming distance by the following method instead of the processing for calculating the hamming distance (S64) as shown in FIG. 19. To be more specific, the intra-cycle permutation processing unit 237 calculates the hamming distance between bit patterns of register fields of a target instruction and an instruction in the preceding cycle for each slot in each instruction sequence (S232). The other processing (S60~S63 and S65~S69) is same as that which has been explained referring to FIG. 19. Therefore, the detailed explanation thereof is not repeated here.

FIG. 44 is a diagram for explaining the processing for calculating the hamming distance between the register fields (S232). For example, when the hamming distance between instructions in each slot in an instruction sequence in the Nth cycle as shown in FIG. 21 and an instruction sequence in the (N+1)th cycle as shown in FIG. 22C is calculated, the hamming distances in the first, second and third slots are 2, 2 and 6, respectively.

Consequently, the sum of the hamming distances is 10 in the example of FIG. 44. In the processing for calculating the sum of hamming distances (S66), the sums of the hamming distances between instructions in the instruction sequence in the Nth cycle as shown in FIG. 21 and 6 patterns of instruction sequences as shown in FIG. 22A~FIG. 22F are calculated in the above-mentioned manner, and the calculated sums are 14, 10, 10, 6, 10 and 10, respectively. In the processing for selecting an instruction sequence (S68), the instruction sequence as shown in FIG. 22D having the minimum sum of hamming distances is selected from among the 6 patterns of instruction sequences.

Note that it is assumed in the processing for calculating the hamming distance (S232) in the present modification that registers have been assigned. Therefore, the processing of the intra-cycle permutation processing unit 237 in the present modification cannot be executed after the processing in the instruction scheduling unit 232 in which registers have not yet been assigned, but executed after the processing in the register assignment unit 234 or the processing in the instruction rescheduling unit 236.

(Third Modification of Intra-cycle Permutation Processing Unit 237)

Figure 45:
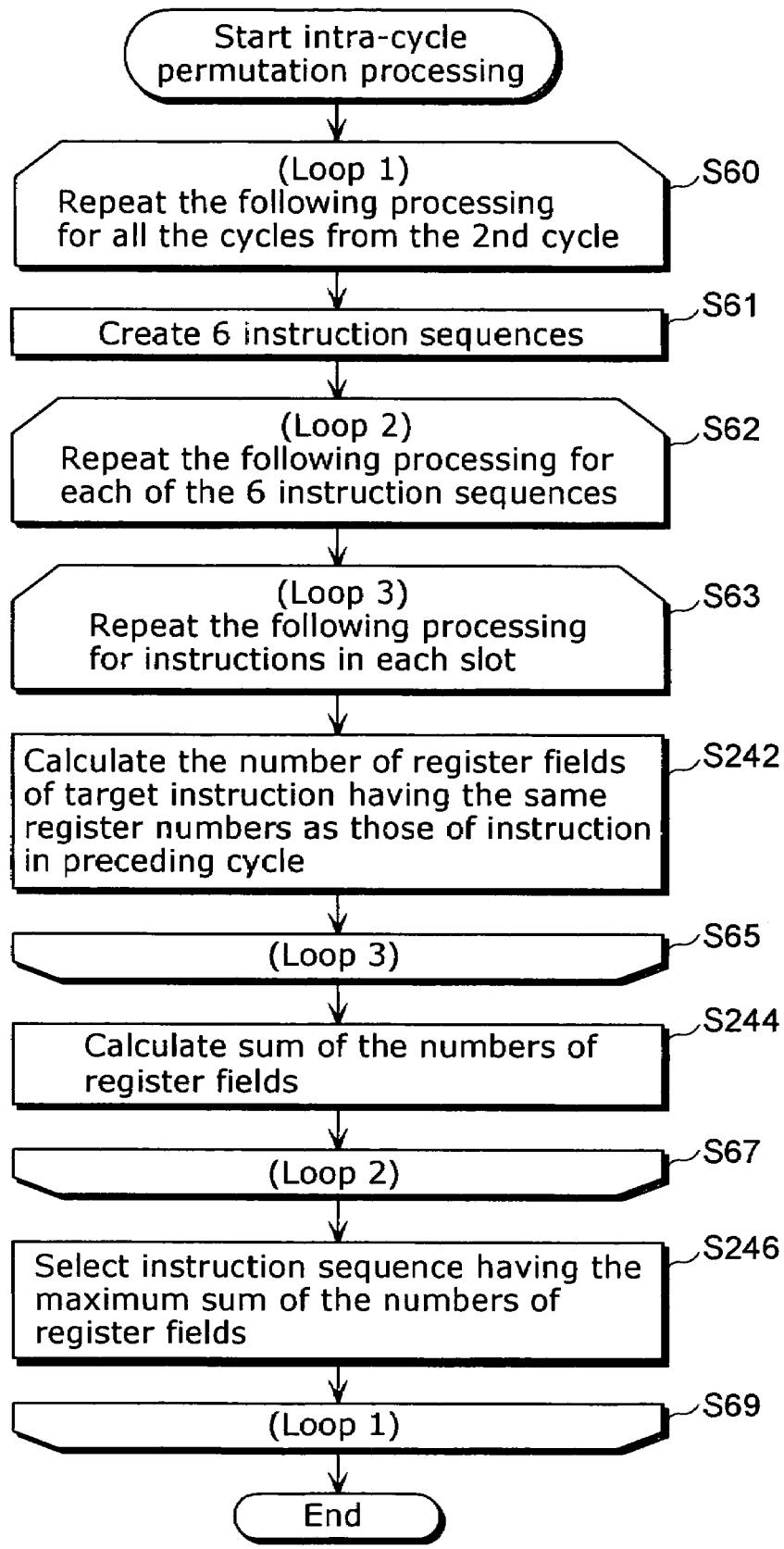
FIG. 45 is a flowchart showing the third modification of the operations of the intra-cycle permutation processing unit 237.

The intra-cycle permutation processing unit 237 may execute the processing as shown in FIG. 45 instead of the processing which has been explained referring to FIG. 19.

FIG. 45 is a flowchart showing the third modification of the operation of the intra-cycle permutation processing unit 237.

The intra-cycle permutation processing unit 237 executes the following processing instead of the processing for obtaining the hamming distance (S64) as shown in FIG. 19. To be more specific, the intra-cycle permutation unit 237 obtains the number of register fields of a target instruction, for each slot in each instruction sequence, having the same register numbers as those of an instruction for the preceding cycle (S242).

The intra-cycle permutation processing unit 237 executes the following processing instead of the processing for obtaining the sum of hamming distances (S66) in FIG. 19. To be more specific, the intra-cycle permutation processing unit 237 obtains the sum of the number of register fields having the same register numbers in the instructions of three slots (S244).

The intra-cycle permutation processing unit 237 further executes the following processing instead of the processing for permuting instructions (S68) as shown in FIG. 19. To be more specific, the intra-cycle permutation processing unit 237 selects the instruction sequence having the maximum number of matching register fields among the sums of the numbers of register fields obtained in each of the six instruction sequences, and permutes the instructions so as to be the same placement as the selected instruction sequence (S246). The other processing (S60~S63, S65 and S67 and S69) is same as the processing which has been explained referring to FIG. 19. Therefore, the detailed explanation thereof is not repeated here.

FIG. 46 is a diagram showing an example of placed instructions. It is assumed that instructions "id R0, R1", "sub1 R2, R3" and "add1 R4, R5" are placed as instructions to be executed in the first, second and third slots, respectively, for the Nth cycle. It is also assumed that instructions "st R5, R8", "mul R2, R3" and "mod R0, R10" are placed as instructions to be executed in the first, second and third slots, respectively, for the (N+1)th cycle.

FIG. 47A~FIG. 47F are diagrams for explaining the processing for creating instruction sequences (S61). For example, six instruction sequences as shown in FIG. 47A~FIG. 47F are created from the three instructions placed for the (N+1)th cycle as shown in FIG. 46.

FIG. 48 is a diagram for explaining the processing for calculating the number of register fields (S242). For example, the number of register fields of the instruction sequence in the (N+1)th cycle as shown in FIG. 47F having the same register numbers as the instruction sequence in the Nth cycle as showing in FIG. 46 is obtained for each slot. As for the first slot, the number of matching register fields is 1 because the registers R0 in the register fields for both cycles match each other but registers in other register fields are different. As for the second slot, the number of matching register fields is 2 because the registers R2 and R3 in the register fields for both cycles match each other. As for the third slot, the number of matching register fields is 0 because there is no register which is common to both register fields.

Consequently, the sum of the numbers of register fields having the same register numbers is 3 in the example of FIG. 48. In the processing for calculating the sum of the numbers of register fields (S244), the sum of the numbers of matching register fields are obtained for the instruction sequence for the Nth cycle as shown in FIG. 46 and each of the six instruction sequences as shown in FIG. 47A~FIG. 47F. The obtained sums are 2, 0, 0, 0, 1 and 3. As a result, in the instruction sequence selection processing (S246), the instruction sequence as shown in FIG. 47F having the maximum sum of the numbers of matching register fields is selected from among the six instruction sequences.

In the present modification, the processing for obtaining the number of register fields (S242) is executed on the assumption that registers have been assigned. Therefore, the processing in the intra-cycle permutation processing unit 237 in the present modification cannot be executed after the processing in the instruction scheduling unit 232 in which registers have not yet been assigned, but is executed after the processing in the register assignment unit 234 or the processing in the instruction rescheduling unit 236.

(Fourth Modification of Intra-Cycle Permutation Processing Unit 237)

The intra-cycle permutation processing unit 237 may execute the following processing instead of the processing which has been explained referring to FIG. 19.

Figure 49:
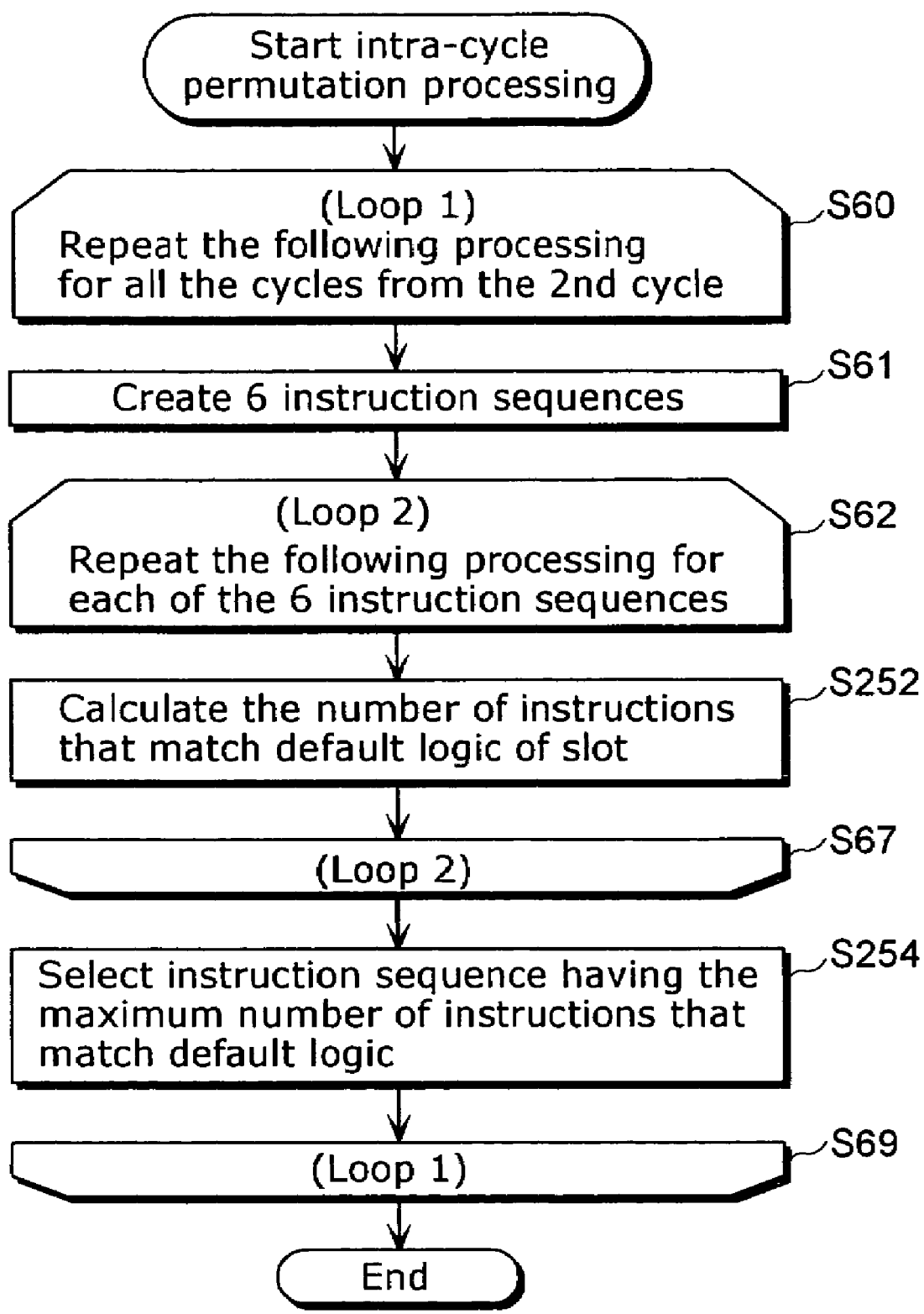
FIG. 49 is a flowchart showing the fourth modification of the operations of the intra-cycle permutation processing unit 237.

FIG. 49 is a flowchart showing the fourth modification of the operation of the intra-cycle permutation processing unit 237.

The intra-cycle permutation processing unit 237 executes the following processing instead of the processing for obtaining the sum of hamming distances for each instruction sequence (S63~S66) in FIG. 19. To be more specific, the intra-cycle permutation processing unit 237 obtains the number of instructions that match the default logic of a slot out of instructions included in a target instruction sequence (S252).

The intra-cycle permutation processing unit 237 executes the following processing instead of the processing for permuting instructions (S68) in FIG. 19. To be more specific, the intra-cycle permutation processing unit 237 selects an instruction sequence including the maximum number of instructions that match the default logic from among the numbers of such instructions obtained for each of the six instruction sequences, and permutes the instructions so as to be same as the selected instruction sequence (S254). The other processing (S60~S62, S67, and S69) is same as the processing which has been explained referring to FIG. 19. Therefore, the detailed explanation thereof is not repeated here.

For example, it is assumed that six instruction sequences as shown in FIGS. 47A~FIG. 47F are created in the processing for creating instruction sequences (S61). As mentioned above, it can be judged, with reference to the first 2 bits of each instruction in an instruction sequence, whether or not the instruction matches the default logic of the slot in which it is placed. For example, since the first 2 bits of the instruction placed in the first slot are "01" in the instruction sequence as shown in FIG. 47B, it matches the default logic of that slot. However, the first 2 bits of the instructions placed in the second and third slots are "11" and "10", respectively, and they do not match the default logics of those slots. Therefore, one instruction matches the default logic of the corresponding slot. In this manner, the numbers of instructions that match the default logics are obtained in the six instruction sequences respectively in the processing for calculating the number of instructions (S252), and the numbers are 3, 1, 1, 0, 0 and 1, respectively. In the processing for selecting an instruction sequence (S254), the instruction sequence as shown in FIG. 47A having the maximum number of instructions that match the default logics is selected from among the six instruction sequences.

As described above, the compiler 200 in the present embodiment allows optimization of instruction placement so that hamming distances between instructions, operation codes and register fields in the same slot for consecutive cycles become smaller. Accordingly, change in values stored in instruction registers of a processor is kept small, and thus it is possible to generate a machine language program for causing the processor to operate with low power consumption.

The compiler 200 in the present embodiment also allows optimization of instruction placement so that the same register fields in the same slot access the same register consecutively. Accordingly, change in control signals for selecting registers is kept small because of consecutive access to the same register, and thus it is possible to generate a machine language program for causing the processor to operate with low power consumption.

Also, the compiler 200 in the present embodiment allows assignment of instructions to respective slots so that the instructions match the default logics of the slots. Therefore, instructions using the common constituent elements of the processor are executed consecutively in the same slot. Accordingly, it is possible to generate a machine language program for causing the processor to operate with low power consumption.

Furthermore, the compiler 200 in the present embodiment allows stop of power supply to a free slot or slots while only one or two slots are in use in consecutive instruction cycles. Accordingly, it is possible to generate a machine language program for causing the processor to operate with low power consumption.

In addition, the compiler 200 in the present embodiment allows specification of the number of slots to be used for execution of a program using a pragma or as an option of compilation. Therefore, free slots can be generated and power supply to the free slots can be stopped, and thus it is possible to generate a machine program for causing the processor to operate with low power consumption.

Up to now, the compiler according to the present invention has been explained based on the present embodiment, but the present invention is not limited to this embodiment.

For example, in the processing for fetching an optimum instruction (S122) executed by the instruction rescheduling unit 236, which has been explained referring to FIG. 28 and FIG. 29, the optimum instruction is specified according to the number of fields having the same register numbers (S152), the hamming distance between a target instruction and an instruction executed just before it (S156) and the default logic of the slot (S160) in this order of priority. However, the present invention is not limited to this priority order, and the optimum instruction may be specified in another order of priority.

Also, various conditions which should be considered for specifying an optimum instruction, such as a hamming distance and a default logic of a slot, are not limited to those in the present embodiment. In summary, such conditions need to be combined or priorities need to be assigned to the conditions so that the total power consumption is reduced when the compiler according to the present invention operates the processor. It is needless to say that the same applies to the processing executed by the instruction scheduling unit 232, the register assignment unit 234 and the intra-cycle permutation processing unit 237 as well as the instruction rescheduling unit 236.

Also, the present invention may be structured so that parameterized combination of these conditions or priorities are integrated as a header file of the source program 202 for compilation, or these parameters may be specifiable as an option of the compiler.

Furthermore, in the processing executed by the optimization unit 230 in the present embodiment, the optimum scheduling method may be selected for each basic block from among several methods. For example, it is acceptable to obtain scheduling results of all the plurality of prepared scheduling methods for each basic unit and select the scheduling method by which power consumption is expected to be reduced most significantly.

The optimum scheduling method may be selected using a method such as back track. For example, when estimated power consumption is larger than expected as a result of register assignment by the register assignment unit 234 even after the instruction scheduling unit 232 selects the scheduling method by which power consumption is expected to be reduced most significantly, the instruction scheduling unit 232 selects, as a trial, another scheduling method by which power consumption is expected to be reduced in the second place. As a result, if the estimated power consumption is smaller than expected, the instruction rescheduling unit 236 may execute the instruction rescheduling processing.

Furthermore, an example where a source program described in C language is converted into a machine language program has been explained in the present embodiment, but the source program may be described in another high-level language than C language or may be a machine language program which has been already compiled by another compiler. When the source program is a machine language program, the present invention is structured so that a machine language program obtained by optimization of that machine language program is outputted.

What is claimed is:

1. A computer-readable storage medium encoded with a compiler apparatus for generating a machine language program for a processor, the processor including a plurality of instruction issue units and a plurality of corresponding execution units, each instruction issue unit issuing instructions to a corresponding execution unit, and each instruction issue unit including instruction registers for storing the instructions issued to the corresponding execution unit, the compiler apparatus comprising:
a parser unit operable to parse a source program by extracting, from the source program, a reserved word stored in a storage unit and by carrying out a lexical analysis of the source program;
an intermediate code conversion unit operable to receive the parsed source program and convert each statement included in the parsed source program into intermediate codes according to a predetermined rule stored in the storage unit, the intermediate codes including instructions;
an optimization unit operable to receive the intermediate codes and optimize scheduling of the instructions of the intermediate codes by:
scheduling the instructions of the intermediate codes for each instruction cycle of a plurality of instruction cycles without changing dependencies between the instructions of the intermediate codes, each of the instruction cycles being an instruction cycle that executes instructions in parallel using the execution units; and
scheduling the instructions of the intermediate codes to reduce a hamming distance between two instructions including (i) an instruction in a target instruction cycle, and (ii) an instruction in an instruction cycle that immediately precedes the target instruction cycle, the two instructions being instructions stored in instruction registers of the same instruction issue unit, the optimization unit being operable to schedule the instructions of the intermediate codes to reduce the hamming distance of instructions which are scheduled for each of the instruction cycles; and a code generation unit operable to receive the optimized intermediate codes and convert the optimized intermediate codes into machine language instructions according to a conversion table stored in the storage unit.

2. The computer-readable storage medium according to claim 1, wherein the optimization unit is operable to optimize the instructions of the intermediate codes by determining an instruction to be executed in the target instruction cycle and determining an instruction issue unit in which the instruction is to be stored so as to reduce a hamming distance between the two instructions when the instructions of the intermediate codes are scheduled for each of the instruction cycles.

3. The computer-readable storage medium according to claim 2, wherein the optimization unit is operable to optimize the instructions of the intermediate codes by determining which instruction is to be executed in the target instruction cycle and determining which instruction register of the instruction issue unit storing the instruction is for storing the instruction, to reduce the hamming distance between the two instructions when the instructions of the intermediate codes are scheduled for each of the instruction cycles.

4. The computer-readable storage medium according to claim 1, wherein the optimization unit is operable to optimize the instructions of the intermediate codes by scheduling the instructions of the intermediate codes to reduce a hamming distance between operation codes of the two instructions, the two instructions being stored in instruction registers of the same instruction issue unit.

5. The computer-readable storage medium according to claim 1, wherein the optimization unit is operable to optimize the instructions of the intermediate codes by scheduling the instructions of the intermediate codes to reduce a hamming distance between register numbers of the two instructions when the instructions of the intermediate codes are scheduled for each of the instruction cycles, the two instructions being stored in instruction registers of the same instruction issue unit.

6. A computer-readable storage medium encoded with a compiler apparatus for generating a machine language program for a processor, the processor including a plurality of instruction issue units and a plurality of corresponding execution units, and each instruction issue unit issuing instructions to a corresponding execution unit, and each instruction issue unit including instruction registers for storing the instructions issued to the corresponding execution unit, the compiler apparatus comprising:

a parser unit operable to parse a source program by extracting, from the source program, a reserved word stored in a storage unit and by carrying out a lexical analysis of the source program;

an intermediate code conversion unit operable to receive the parsed source program and convert each statement included in the parsed source program into intermediate codes according to a predetermined rule stored in the storage unit, the intermediate codes including instructions;

an optimization unit operable to receive the intermediate codes and optimize the instructions of the intermediate codes by:

changing, for each instruction cycle of a plurality of instruction cycles, a correspondence between (i) instructions of the intermediate codes to be executed in the same instruction cycle and (ii) the instruction issue units from which the instructions are issued, the optimization unit changing the correspondence without changing dependencies between the instructions of the intermediate codes converted by the intermediate code conversion unit, and each of the instruction cycles being an instruction cycle that executes instructions in parallel using the execution unit; and changing the correspondence between (i) instructions to be executed in a target instruction cycle and (ii) the instruction issue units from which the instructions are issued, to reduce a hamming distance between two instructions including an instruction to be executed in the target instruction cycle and an instruction in an instruction cycle that immediately precedes the target instruction cycle, the two instructions being instructions stored in instruction registers of the same instruction issue unit; and a code generation unit operable to receive the optimized intermediate codes and convert the optimized intermediate codes into machine language instructions according to a conversion table stored in the storage unit.

7. The computer-readable storage medium according to claim 6, wherein the optimization unit is operable to optimize the instructions of the intermediate codes by changing the correspondence between (i) the instructions to be executed in the target instruction cycle, and (ii) the instruction issue units from which the instructions are issued, to reduce a sum of hamming distances, each of the hamming distances being calculated between the two instructions, the two instructions being issued to an identical instruction issue unit, and the two instructions used to calculate the sum of the hamming distances being included in the instruction issue units, respectively.

8. The computer-readable storage medium according to claim 6, wherein the optimization unit is operable to optimize the instructions of the intermediate codes by changing the correspondence between (i) the instructions to be executed in the target instruction cycle, and (ii) the instruction issue units in which the instructions are issued, to reduce a hamming distance between operation codes of the two instructions.

9. The computer-readable storage medium according to claim 6, wherein the optimization unit is operable to optimize the instructions of the intermediate codes by changing the correspondence between (i) the instructions to be executed in the target instruction cycle, and (ii) the instruction issue units in which the instructions are issued, to reduce a hamming distance between register numbers of the two instructions.

10. A method for generating a machine language program for a processor, the processor including a plurality of instruction issue units and a plurality of corresponding execution units, each instruction issue unit issuing instructions to a corresponding execution unit, and each instruction issue unit including instruction registers for storing the instructions issued to the corresponding execution unit, the method comprising:

parsing a source program by extracting, from the source program, a reserved word stored in a storage unit and by carrying out a lexical analysis of the source program;

converting each statement included in the parsed source program into intermediate codes according to a predetermined rule stored in the storage unit, the intermediate codes including instructions;

optimizing scheduling of the instructions of the intermediate codes by:

scheduling the instructions of the intermediate codes for each instruction cycle of a plurality of instruction cycles without changing dependencies between the instructions of the intermediate codes, each of the instruction cycles being an instruction cycle that executes instructions in parallel using the execution units; and scheduling the instructions of the intermediate codes to reduce a hamming distance between two instructions including (i) an instruction in a target instruction cycle, and (ii) an instruction in an instruction cycle that immediately precedes the target instruction cycle, the two instructions being instructions stored in instruction registers of the same instruction issue unit, and the scheduling of the instructions of the intermediate codes reducing the hamming distance of instructions scheduled for each of the instruction cycles; and converting the optimized intermediate codes into machine language instructions according to a conversion table stored in the storage unit.

11. A method for generating a machine language program for a processor, the processor including a plurality of instruction issue units and a plurality of corresponding execution units, each instruction issue unit issuing instructions to a corresponding execution unit, and each instruction issue unit including instruction registers for storing the instructions issued to the corresponding execution unit, the method comprising:

parsing a source program by extracting, from the source program, a reserved word stored in a storage unit and by carrying out a lexical analysis of the source program;

converting each statement included in the parsed source program into intermediate codes according to a predetermined rule stored in the storage unit, the intermediate codes including instructions;

optimizing the instructions of the intermediate codes by:

changing, for each instruction cycle of a plurality of instruction cycles, a correspondence between (i) instructions of the intermediate codes to be executed in the same instruction cycle and (ii) the instruction issue units from which the instructions are issued, the optimization unit changing the correspondence without changing dependencies between the instructions of the intermediate codes converted by the converting of each statement, and each of the instruction cycles being an instruction cycle that executes instructions in parallel using the execution units; and changing the correspondence between (i) instructions to be executed in a target instruction cycle and (ii) the instruction issue units from which the instructions are issued, to reduce a hamming distance between two instructions including an instruction to be executed in the target instruction cycle and an instruction in an instruction cycle that immediately precedes the target instruction cycle, the two instructions being instructions stored in instruction registers of the same instruction issue unit; and converting the optimized intermediate codes into machine language instructions according to a conversion table stored in the storage unit.

12. A computer-readable storage medium encoded with a compiler program for generating a machine language program for a processor, the processor including a plurality of instruction issue units and a plurality of corresponding execution units, each instruction issue unit issuing instructions to a corresponding execution unit, and each instruction issue unit including instruction registers for storing the instructions issued to the corresponding execution unit, the compiler program causing a computer to execute a method comprising:

parsing a source program by extracting, from the source program, a reserved word stored in a storage unit and by carrying out a lexical analysis of the source program;

converting each statement included in the parsed source program into intermediate codes according to a predetermined rule stored in the storage unit, the intermediate codes including instructions;

optimizing scheduling of the instructions of the intermediate codes by:

scheduling the instructions of the intermediate codes for each instruction cycle of a plurality of instruction cycles without changing dependencies between the instructions of the intermediate codes, each of the instruction cycles being an instruction cycle that executes instructions in parallel using the execution units; and scheduling the instructions of the intermediate codes to reduce a hamming distance between two instructions including (i) an instruction in a target instruction cycle, and (ii) an instruction in an instruction cycle that immediately precedes the target instruction cycle, the two instructions being instructions stored in instruction registers of the same instruction issue unit, the scheduling of the instructions of the intermediate codes reducing the hamming distance of instructions scheduled for each of the instruction cycles; and converting the optimized intermediate codes into machine language instructions according to a conversion table stored in the storage unit.

13. A computer-readable storage medium encoded with a compiler program for generating a machine language program for a processor, the processor including a plurality of instruction issue units and a plurality of corresponding execution units, each instruction issue unit issuing instructions to a corresponding execution unit, and each instruction issue unit including instruction registers for storing the instructions issued to the corresponding execution unit, the compiler program causing a computer to execute a method comprising:

parsing a source program by extracting, from the source program, a reserved word stored in a storage unit and by carrying out a lexical analysis of the source program;

converting each statement included in the parsed source program into intermediate codes according to a predetermined rule stored in the storage unit, the intermediate codes including instructions;

optimizing the instructions of the intermediate codes by:

changing, for each instruction cycle of a plurality of instruction cycles, a correspondence between (i) instructions of the intermediate codes to be executed in the same instruction cycle and (ii) the instruction issue units from which the instructions are issued, the optimization unit changing the correspondence without changing dependencies between the instructions of the intermediate codes converted by the converting of each statement, and each of the instruction cycles being an instruction cycle that executes instructions in parallel using the execution units; and changing the correspondence between (i) instructions to be executed in a target instruction cycle and (ii) the instruction issue units from which the instructions are issued, to reduce a hamming distance between two instructions including an instruction to be executed in the target instruction cycle and an instruction in an instruction cycle that immediately precedes the target instruction cycle, the two instructions being instructions stored in instruction registers of the same instruction issue unit; and converting the optimized intermediate codes into machine language instructions according to a conversion table stored in the storage unit.

* * * * *